United States Patent
Liu et al.

(10) Patent No.: US 11,913,105 B2
(45) Date of Patent: Feb. 27, 2024

(54) HIGH-EFFICIENCY AND SHORT-PROCESS METHOD FOR PREPARING A HIGH-STRENGTH AND HIGH-CONDUCTIVITY COPPER ALLOY

(71) Applicant: Zhejiang University, Zhejiang (CN)

(72) Inventors: Jiabin Liu, Zhejiang (CN); Hongtao Wang, Zhejiang (CN); Youtong Fang, Zhejiang (CN); Xiaoyang Fang, Zhejiang (CN); Jindong Zhang, Zhejiang (CN); Litian Wang, Zhejiang (CN); Liang Meng, Zhejiang (CN)

(73) Assignee: Zhejiang University, Hangzhou (CN)

( * ) Notice: Subject to any disclaimer, the term of this patent is extended or adjusted under 35 U.S.C. 154(b) by 276 days.

(21) Appl. No.: 17/239,684

(22) Filed: Apr. 26, 2021

(65) Prior Publication Data
US 2021/0332467 A1   Oct. 28, 2021

(30) Foreign Application Priority Data

Apr. 24, 2020   (CN) ........................ 202010334800.2

(51) Int. Cl.
| | |
|---|---|
| *C22F 1/08* | (2006.01) |
| *B21C 23/00* | (2006.01) |
| *B22D 11/00* | (2006.01) |
| *B22D 11/055* | (2006.01) |
| *B22D 11/115* | (2006.01) |
| *B22D 11/124* | (2006.01) |
| *C22C 9/06* | (2006.01) |
| *C22C 19/05* | (2006.01) |

(52) U.S. Cl.
CPC .............. *C22F 1/08* (2013.01); *B21C 23/001* (2013.01); *B22D 11/004* (2013.01); *B22D 11/055* (2013.01); *B22D 11/115* (2013.01); *B22D 11/124* (2013.01); *C22C 9/06* (2013.01); *C22C 19/056* (2013.01)

(58) Field of Classification Search
CPC ....................................................... C22F 1/08
See application file for complete search history.

(56) References Cited

U.S. PATENT DOCUMENTS

| | | | |
|---|---|---|---|
| 6,679,955 B2 | 1/2004 | Mino | |
| 2006/0086437 A1* | 4/2006 | Nippert | C22C 9/00 148/554 |
| 2017/0145549 A1* | 5/2017 | Plett | B21C 1/003 |
| 2018/0066339 A1* | 3/2018 | Li | C22C 9/04 |

FOREIGN PATENT DOCUMENTS

| | | | |
|---|---|---|---|
| CN | 104928603 A | 9/2015 | |
| CN | 106756212 A | 5/2017 | |
| CN | 107159739 A * | 9/2017 | B21C 37/02 |

OTHER PUBLICATIONS

Frank F. Kraft and Jay S. Gunasekera, Conventional Hot Extrusion, ASM Handbook, vol. 14A: Metalworking: Bulk Forming, S.L. Semiatin, editor, p. 421-439 (Year: 2005).*

* cited by examiner

*Primary Examiner* — Christopher S Kessler

(57) ABSTRACT

A high-efficiency and short-process method for preparing a high-strength and high-conductivity copper alloy is disclosed, comprising the following steps: performing horizontal continuous casting to obtain an as-cast primary billet of copper alloy, wherein the alloying elements in the obtained as-cast primary billet being in a supersaturated solid solution state; after peeling the obtained as-cast primary billet, directly performing continuous extrusion, cold working and aging annealing treatment to obtain a copper alloy, and keeping the alloying elements of the billet in a supersaturated solid solution state during the process of continuous extrusion. The method shortens the flow, reduces energy consumption and improves the product forming rate.

8 Claims, 13 Drawing Sheets ary alloy conductors used. Taking the large-scale integrated circuits as an example, with the increasingly higher circuit integration and continuous improvement of power density, the copper alloys, as the integrated circuit lead frames, should not only have high strength, but also have high electrical conductivity and thermal conductivity, so as to ensure that low thermal effect is generated and fast heat dissipation is achieved. At the same time, in order to meet the semiconductor process requirements, the lead frame copper alloy must have excellent dimensional accuracy, that is, it needs to have high strength, high conductivity, and high precision. Taking the connector of 4G/5G mobile phone as an example, the most common is the copper alloy connector used in the charging interface of the mobile phones. It not only needs to have high conductivity to minimize the contact resistance and the thermal effect of large current charging, but also needs to have high strength to meet the requirement for continuous miniaturization. In addition, it needs to have anti-stress relaxation performance to maintain the set connection force, that is, have a variety of characteristics including high strength, high conductivity and anti-stress relaxation.

HIGH-EFFICIENCY AND SHORT-PROCESS METHOD FOR PREPARING A HIGH-STRENGTH AND HIGH-CONDUCTIVITY COPPER ALLOY

CROSS REFERENCE TO RELATED APPLICATIONS

The present application claims the benefit of Chinese Patent Application No. 202010334800.2 filed on Apr. 24, 2020, the contents of which are incorporated herein by reference in its entirety.

FIELD OF THE INVENTION

The present invention generally relates to the field of non-ferrous metal processing, in particular to a method for preparing a high-strength and high-conductivity copper alloy.

BACKGROUND

As a typical representative of conductive materials, copper alloys have a wide range of applications in electrical engineering. With the development of 5G information age, higher requirements are proposed for the key copper alloy conductors used. Taking the large-scale integrated circuits as an example, with the increasingly higher circuit integration and continuous improvement of power density, the copper alloys, as the integrated circuit lead frames, should not only have high strength, but also have high electrical conductivity and thermal conductivity, so as to ensure that low thermal effect is generated and fast heat dissipation is achieved. At the same time, in order to meet the semiconductor process requirements, the lead frame copper alloy must have excellent dimensional accuracy, that is, it needs to have high strength, high conductivity, and high precision. Taking the connector of 4G/5G mobile phone as an example, the most common is the copper alloy connector used in the charging interface of the mobile phones. It not only needs to have high conductivity to minimize the contact resistance and the thermal effect of large current charging, but also needs to have high strength to meet the requirement for continuous miniaturization. In addition, it needs to have anti-stress relaxation performance to maintain the set connection force, that is, have a variety of characteristics including high strength, high conductivity and anti-stress relaxation.

The development of various high-strength and high-conductivity copper alloys and the high-efficiency and high-quality preparation technology is a key development direction of common concern in the field of copper alloys. At present, the design of material compositions of high-strength and high-conductivity copper alloys mainly focuses on binary copper alloys such as copper silver, copper magnesium, copper tin, copper chromium, copper zirconium, copper iron, copper beryllium, copper titanium, copper cadmium, etc., and ternary alloys such as copper-iron-phosphorus, copper-nickel-silicon, copper-chromium-zirconium, etc., and multi-element complex alloys that are further microalloyed on the basis of the above alloys.

The Chinese patent (application number 201710012956.7) discloses a method for continuous casting and continuous extrusion to produce precipitation-strengthened high-strength copper-chromium alloys. The copper alloy rods are formed by horizontal continuous casting methods, after online heating and solid solution, the billet is directly produced through continuous extrusion, then after cold rolling and aging treatment and finishing, products with acceptable performance and size are obtained. The present invention adopts continuous extrusion technology to produce high-performance copper-chromium-zirconium alloy materials. The production process has been simplified to a certain extent, eliminating the processes of milling, hot-rolling cogging and blooming processes, reducing the number of intermediate rolling passes, reducing the enterprise equipment investment and lowering the energy consumption, increasing the production efficiency and product yield. However, this manufacturing method cannot obtain casting blanks in which the alloying elements are in a supersaturated solid solution state in the horizontal continuous casting process, and it is necessary to conduct further high-temperature solid solution treatment on the casting blanks such that the alloying elements in the casting blanks are in a supersaturated solid solution state, which is to be improved in terms of energy saving; in addition, it needs to avoid precipitation decomposition of the solid solution state during the continuous extrusion process. If it is intended to have a solid solution state of the materials before aging, it is usually required to conduct a high-temperature solid solution heat treatment before aging. However, this treatment will not only consume high energy, but also lead to the complete loss of the pre-cold rolling hardening effect.

According to the publicly available information, there are extensive studies on the composition design of high-strength and high-conductivity copper alloys and various alloy compositions have been proposed. There are a variety of methods for preparing high-strength and high-conductivity copper alloys, some of which have been industrialized. However, these methods basically belong to the traditional three-stage processing method of copper alloy, that is, smelting and casting-hot working-cold working, plus appropriate heat treatment processes. The hot working includes hot extrusion, hot rolling, hot forging, and solid solution, etc. The cold working includes cold rolling, cold drawing, etc. These preparation methods of high-strength and high-conductivity copper alloys have the problems of multiple processes, high energy consumption, low yield, high production cost and equipment investment, and the copper alloy performance needs to be improved.

Therefore, the innovations of high-performance copper alloy processing industry should focus on the short process, continuity, energy saving, low investment, low cost and guaranteeing the high strength and high conductivity performance of copper alloys.

SUMMARY

The object of the present invention is to provide a method for preparing a high-strength and high-conductivity copper alloy continuously, to shorten the process, reduce energy consumption and cost, increase the product forming rate and ensure the high strength and high conductivity of the copper alloy.

The technical solutions adopted in the invention are as follows:

A method for preparing a copper alloy, comprising the following steps:
(a) Performing horizontal continuous casting to obtain an as-cast primary billet of copper alloy, wherein the alloying elements in the obtained as-cast primary billet being in a supersaturated solid solution state without precipitation strengthening;
(b) After peeling the as-cast primary billet obtained in step (a), directly performing continuous extrusion, cold working and aging annealing treatment to obtain a copper alloy, and keeping the alloying elements of the billet in supersaturated solid solution without precipitation strengthening during the process of continuous extrusion.

In the present invention, the alloying element in the primary billet is in a supersaturated solid solution state through horizontal continuous casting, that is, ensuring that the alloying elements exist in the copper matrix in the form of a solid solution atom, which is equivalent to forming a supersaturated copper solid solution, such that it can save the high-temperature solid solution link that consumes the highest energy in the conventional process to make the primary billets obtained from the horizontal continuous casting to have the possibility to directly enter the subsequent continuous extrusion. The design of the horizontal continuous casting step of the present invention not only shortens the process flow, but also effectively refines grains and guarantees high strength of alloys. The primary billets obtained by horizontal continuous casting do not need to undergo high-temperature solid solution heat treatment after peeling, but directly undergo continuous extrusion, cold working and aging annealing, and during the continuous extrusion process, the alloying elements in the billets maintain a supersaturated solid solution state. This step is designed to fully break the as-cast microstructure and refine the grains through continuous extrusion, superimpose a large amount of dislocations generated by cold working, such that the alloys have high crystal defects and guarantee that the alloys have high strength characteristics, followed by aging annealing and using dislocation cores as a fast channel for atomic diffusion, the alloying elements are dispersed and precipitated as second-phase nanoparticles, which not only purifies the copper matrix and restores high conductivity of alloys, but also pins the dislocation line to produce a diffusion hardening effect, and at the same time releases cold working deformation energy, to avoid stress cracking. Most importantly, the design of the above steps (a) and (b) enables the present invention to maintain the supersaturated solid solution state of the copper alloy from the casting stage until controlled precipitation during aging treatment; because the solid solution state is uniform in nature, it can ensure uniform deformation of materials in the intermediate processing stage, to enhance the product yield rate; moreover, the precipitation kinetic accumulated in the solid solution state is uniformly released in the uniform temperature field of the aging treatment stage, which makes strong precipitation kinetic and controllable precipitation behavior, and produces uniform precipitation microstructure, thereby guaranteeing the consistency of performance.

In order to realize that the alloying element in the horizontal continuous casting primary billet is in a supersaturated solid solution state, the present invention increases the cooling intensity of the horizontal continuous casting process so that the primary billet has a high cooling and solidification rate. Specifically, the high cooling intensity of the horizontal continuous casting is guaranteed through the following techniques: (1) A multi-channel water-cooled crystallizer is used, which is provided with three groups of independent cooling units along the extraction direction of the primary billet to realize multi-channel water inflow and multi-channel water outflow, and a reverse cooling method is adopted, i.e. water inflow from the cold end and water outflow from the hot end, and some technical parameters are designed to ensure the appropriate rapid cooling effect; (2) Considering that rapid cooling may make the viscosity of the metal melt to sharply increase and cause casting defects such as broken billets, holes, etc., an electromagnetic stirring device is provided for electromagnetic stirring to reduce the viscosity and guarantee the continuous progress of horizontal continuous casting; (3) Perform strong cooling on the primary billet at the outlet of the crystallizer to avoid partial precipitation of the solid solution state.

Specifically, the horizontal continuous casting is preferably implemented as follows: installing at least one multi-channel water-cooled crystallizers under the side of the holding furnace, the multi-channel water-cooled crystallizers being provided with three groups of independent cooling units along the extraction direction of the primary billet to realize multi-channel water inflow and multi-channel water outflow, and adopting a reverse cooling method (i.e. water inflow from the cold end, and water outflow from the hot end), to allow the first group of cooling units to be closest to the holding furnace; making the temperature of the water inlet of each group of cooling units lower than 20° C., and controlling the temperature gradient of the three groups of cooling units by the following method: the water flow $V3$ of the third group of cooling units and the primary billet cross-sectional area S should satisfy $0.5$ L/(min·mm$^2$)<$V3$/S<$2$ L/(min·mm$^2$), and the water flow $V2$ of the second group of cooling units and the water flow $V1$ of the first group of cooling units are determined according to the principle of $V1:V2:V3=1.5:1.2:1$; providing electromagnetic induction coils on the outer walls of the water cooling jackets of the first and second groups of cooling units of the multi-channel water-cooled crystallizer to achieve electromagnetic stirring, the electromagnetic stirring method being rotary stirring, and the current frequency being set to 2 to 500 Hz; controlling the primary billet cross-sectional area S to be 2000 to 50 mm$^2$, and the extraction speed and the primary billet cross-sectional area satisfying $0.5$ mm·min≤S/v≤$20$ mm·min; providing a water curtain spray cooling device within 1000 mm outside the outlet of the multi-channel water-cooled crystallizer to cool the primary billet, the spray device adopting an atomizing nozzle, and the nozzle interval being 10 to 20 mm, setting the number according to the size of the billet, such that the distance between the nozzle and the surface of the billet is 10 to 50 mm and the water pressure is 0.5 to 0.8 MPa, so as to obtain the primary billet whose alloying elements are all in a supersaturated solid solution state.

To achieve efficient production, a set of horizontal continuous casting system is matched with a plurality of crystallizers, for example, 2 to 4 crystallizers to achieve continuous extraction of 2 to 4 primary billets, at this time, the crystallizers are lined up in arrangement with an interval of 200 to 400 mm, and each set of multi-channel water-cooled crystallizer is equipped with independent water cooling and electromagnetic devices.

In step (b) of the present invention, it is necessary to ensure the precipitation decomposition of the supersaturated solid solution in the continuous extrusion process and to guarantee the high strength and high conductivity of the copper alloy. In order to achieve the above technical effects, the present invention has designed the combinations of the following three technical means.

1) Preheating the extrusion die and casting blank at high temperature to avoid precipitation decomposition of supersaturated solid solution;

2) Continuous extrusion at a high extrusion ratio: continuous extrusion parameters with high extrusion ratio are used, which can, on the one hand, ensure a sufficiently high deformation temperature to prevent solid solution precipitation, and on the other hand, make the casting blank to undergo violent plastic deformation in the cavity to fully break the as-cast microstructure and form recrystallized microstructure.

3) Rapid cooling: Through high-intensity cooling, the billet is quickly cooled from high temperature to room temperature to avoid precipitation decomposition of supersaturated solid solution.

The combination of the above technical means can achieve dual purposes: firstly, the as-cast microstructure undergoes violent plastic deformation to improve the uniformity and strength of the microstructure; and secondly, it avoids the earlier precipitation decomposition of the supersaturated solid solution. However, the high temperature and continuous extrusion of high extrusion ratio make the working temperature and working pressure of the cavity significantly higher than those of conventional continuous extrusion, which can easily lead to jamming and die bursting. Therefore, the power of the extruder must be increased and high-temperature alloy molds are used. Therefore, the preferred process conditions of the continuous extrusion in the step (b) of the present invention are as follows: (1.1) adopting forged Ni-base superalloy for an extrusion die, the superalloy containing 0.05 wt. % C, 15 wt. % Cr, 6 wt. % Mo, 5 wt. % W, 2 wt. % Ti, 5.5 wt. % Al, and Ni; performing process smelting of the superalloy through vacuum melting+ electroslag remelting, and forming by hot forging and heat treatment after homogenization; (1.2) Preheating the extrusion die to 500 to 600° C. before extrusion, preheating the copper alloy as-cast primary billet to 700 to 750° C., and then entering the cavity of the extrusion die for continuous extrusion to obtain the billet, controlling the rotation speed of the extrusion wheel at 3 to 8 rpm, the extrusion ratio at 3 to 8, and the extrusion gap at 0.6 to 2 mm, which on the one hand, can ensure a sufficiently high deformation temperature to prevent solid solution precipitation, and on the other hand, soften the copper alloy primary billet, reduce the deformation resistance, and increase the metal plasticity flow capacity; (1.3) performing a high-intensity cooling water spray of the billet obtained in step (1.2) at the outlet of the extrusion die, the spray device adopting an atomizing nozzle instead of conventional small hole for spraying, and the nozzle interval being 10 to 20 mm, setting the number according to the size of the billet, and the distance between the nozzle and the surface of the billet being 10 to 50 mm, the water pressure being 0.5 to 0.8 MPa, cooling the billet quickly from high temperature to room temperature to avoid the precipitation decomposition of the supersaturated solid solution.

In the present invention, the forged Ni-base superalloy can be prepared with reference to the prior art, specifically it is recommended to prepare according to the following steps: smelting an alloy ingot by the vacuum melting+ electroslag remelting process, after homogenizing the alloy ingot at 1250° C.×1 to 4 h, forming by isothermal forging at 1000° C. to 1050° C., with a deformation of 80% to 90%; afterwards, holding at 800° C. for 8 to 16 hours, and tempering 1 to 2 hours at 300° C. to 400° C. after water quenching. The forged Ni-base superalloy has very good high temperature mechanical properties and can be used as a die of continuous extrusion, especially as a plug component with the most demanding service requirements.

In the step (b) of the present invention, the cold working may adopt cold rolling, cold drawing, etc. In order to ensure the deformation of cold working, further preferably, the pass deformation of cold working is 5% to 10%, and the cumulative deformation is 50% to 99%, such that the obvious plastic deformation occurs inside the billet, forming a large number of dislocation tangles.

In the step (b) of the present invention, to ensure sufficient annealing, the annealing temperature is required to be 300 to 600° C., and the holding time is 0.5 to 100 h. In the present invention, it is particularly preferable to select annealing temperature and holding time according to the following principles: taking the billet samples after cold working, and holding at 300, 350, 400, 450, 500, 550, 600° C. for 0.1, 0.5, 1, 2, 4, 8, 16, 24, 48, 99.6 h respectively; testing the Vickers hardness (in unit of HV) and conductivity (in unit of % IACS) of the samples, and calculating the product of the hardness number and the conductivity value, and taking the test temperature of the sample with the largest product as the product annealing temperature, and taking the test time of the sample with the largest product plus 0.4 as the product annealing holding time.

The method for preparing the copper alloy of the present invention mainly includes four core steps, namely, horizontal continuous casting, continuous extrusion, cold working, and aging annealing, which can be flexibly matched with the auxiliary steps of batching, peeling, sampling, rewinding, unwinding, slitting, and packaging, etc. according to the designed product. A typical preparation process is as follows: performing batching according to the designed product material, performing smelting and holding, and horizontal casting of the primary billet in a horizontal continuous casting furnace; conducting peeling treatment of the primary billet; delivering to a continuous extrusion machine for extrusion and extruding the billets of the preset shape, and then performing cold working to the preset size and aging annealing, and finally slitting, packaging and leaving the factory.

In the present invention, it is particularly preferred that the method for preparing the copper alloy is carried out according to the following steps:

(1) Batching and melting: performing batching according to the copper alloy compositions, feeding into a melting furnace to fully melt, conduct sampling detection and analysis of oxygen content and alloying element content, and after supplementing and fully deoxidization according to the analysis results, introducing the melt into the holding furnace through the melting furnace internal guide groove;

(2) Horizontal continuous casting: performing the horizontal continuous casting under the side of the holding furnace, installing at least one multi-channel water-cooled crystallizers under the side of the holding furnace, the crystallizers being provided with three groups of independent cooling units along the extraction direction of the primary billet to realize multi-channel water inflow and multi-channel water outflow, and adopting a reverse cooling method, i.e. water inflow at the cold end and water outflow at the hot end, to allow the first group of cooling units to be closest to the holding furnace; making the temperature of the water inlet of each group of cooling units lower than 20° C. (if the actual water temperature in summer exceeds 20° C., a pre-cooling device is required), and controlling the temperature gradient of the three groups of cooling units by the following method: the water flow V3 of the third group of cooling units and the primary billet cross-sectional area S are determined according to the principle of $0.5 \text{ L/(min·mm}^2) < V3/S < 2 \text{ L/(min·mm}^2)$, and the water flow V2 of the second group of cooling units and the water flow V1 of the first group of cooling units are determined according to the principle of V1:V2:V3=1.5:1.2:1, to achieve the cooling capacity of the three groups of cooling units with different strengths to form a reasonable temperature gradient; providing electromagnetic induction coils on the outer walls of the water cooling jackets of the first and second groups of cooling units of the crystallizer to achieve electromagnetic stirring, the electromagnetic stirring method being rotary stirring, and the current frequency being set to 2 to 500 Hz; the primary billet cross-sectional area S being set to 2000 to 50 mm$^2$, and the extraction speed and the primary billet cross-sectional area are determined according to the principle of 0.5 mm·min≤S/v≤20 mm·min; providing a water curtain spray cooling device within 1000 mm outside the outlet of the crystallizer to cool the primary billet, the spray device adopting an atomizing nozzle instead of conventional small hole for spraying, and the nozzle interval being 10 to 20 mm, setting the number of nozzles according to the size of the billet, the distance between the nozzle and the surface of the billet being 10 to 50 mm, and the water pressure being 0.5 to 0.8 MPa;

(3) Continuous extrusion: After peeling the as-cast primary billet obtained from horizontal continuous casting, directly performing continuous extrusion, preheating the extrusion die to 500 to 600° C., preheating the copper alloy as-cast primary billet to 700 to 750° C., and then entering the cavity of the extrusion die for extrusion, controlling the rotation speed of the extrusion wheel at 3 to 8 rpm, the extrusion ratio at 3 to 8, and the extrusion gap at 0.6 to 2 mm; performing a high-intensity cooling water spray at the outlet of the extrusion die to quickly cool the billet from high temperature to room temperature, the spray device adopting an atomizing nozzle, and the nozzle interval being 10 to 20 mm, setting the number according to the size of the billet, and the distance between the nozzle and the surface of the billet being 10 to 50 mm, the water pressure being 0.5 to 0.8 MPa; the material of the extrusion die being forged Ni-base superalloy, which contains 0.05% C, 15% Cr, 6% Mo, 5% W, 2% Ti, 5.5% Al, and Ni; performing process smelting of the superalloy through vacuum melting+electroslag remelting, and forming by hot forging and heat treatment after homogenization;

(4) Cold working: Carry out cold working of the billet after continuous extrusion according to product requirements, the pass deformation of cold working being 5% to 10%, and the cumulative deformation being 50% to 99%;

(5) Aging annealing treatment: coiling the billet after cold working and placing in a bell-type heating furnace for aging annealing treatment, first placing the billet on the lining, and then hoisting to cover the lining after the heating furnace body reaches the preset temperature, quickly heating the billet, after reaching the preset holding time, lifting the furnace body by a crane to make the billet to cool down quickly, introducing the reducing atmosphere throughout the heat treatment process to avoid oxidation; determining the product aging annealing temperature and time according to the following principles: taking billet samples after cold working in several groups, annealing at 300, 350, 400, 450, 500, 550, 600° C. for 0.1, 0.5, 1, 2, 4, 8, 16, 24, 48, 99.6 h respectively; testing the Vickers hardness and conductivity of the samples, and calculating the product of the hardness number (in unit of HV) and the conductivity value (in unit of % IACS), and taking the test temperature of the sample with the largest product as the product annealing temperature, and taking the test time of the sample with the largest product plus 0.4 as the product annealing holding time;

(6) Inspecting and packaging, and leaving the factory.

The preparation method of the present invention is mainly for the high-strength and high-conductivity copper alloy, especially suitable for precipitation-strengthened high-strength and high-conductivity copper alloys, for example, high copper alloys such as Cu-X binary alloys, Cu-X-Y ternary alloys and multi-element alloys listed in the background art.

Using the above technical solutions, the present invention can achieve the following technical effects.

(1) The present invention breaks through the traditional three-stage copper fabrication process, eliminates the high-temperature solid solution that consumes a lot of energy, greatly shortens the process flow, and realizes continuous casting, extrusion, and cold working, thus, it significantly improves the production pace and increases the production capacity.

(2) The horizontal continuous casting of the present invention makes the alloying element in the primary billet in a supersaturated solid solution state, which not only shortens the process, but also effectively refines grains, improves the uniformity of the microstructure, and guarantees the high strength of the alloy.

(3) The continuous extrusion of the present invention can maintain the supersaturated solid solution state of the copper alloy, and make the copper matrix of the solid solution state to produce high-density dislocation tangles by utilizing the severe deformation caused by continuous extrusion and the large deformation caused by the cold working, to guarantee that the alloy has high strength characteristics; then the rapid diffusion channel characteristics of the dislocation cores promote the sufficient dispersion and precipitation of the alloying elements in the subsequent aging treatment, purify the copper matrix, and guarantee the high conductivity characteristics of the copper alloy.

(4) The core idea of the present invention is to keep the supersaturated solid solution state of copper alloy from the casting stage until the controlled precipitation during the aging treatment. Because the solid solution state is uniform in nature, it can ensure uniform deformation of materials in the intermediate processing stage, to enhance the product yield rate; moreover, the precipitation kinetic accumulated in the solid solution state is uniformly released in the uniform temperature field of the aging treatment stage, which makes strong precipitation kinetic and controllable precipitation behavior, and produces uniform precipitation microstructure, thereby guaranteeing the consistency of performance.

DETAILED DESCRIPTION

Figure 1:
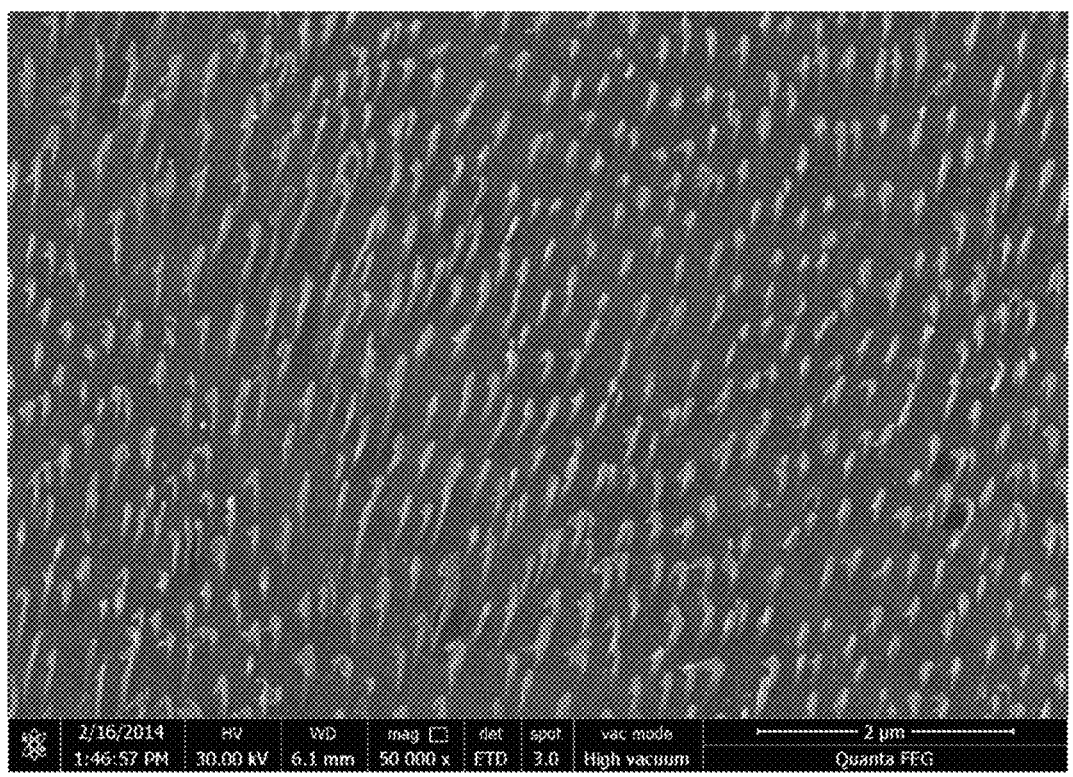
FIG. 1: A TEM photo of the copper alloy product of Example 1, showing a large number of fine Ag precipitated phases in the Cu-0.5 wt. % Ag alloy product obtained by the method of the present invention.

The technical solution of the present invention will be further described below through the specific embodiments, but the scope of protection of the present invention is not limited to thereto.

Example 0: Example of Preparing a Forged Ni-Base Superalloy

The alloy ingot was smelted by vacuum melting+electroslag remelting process, with the compositions of 0.05 wt. % C, 15 wt. % Cr, 6 wt. % Mo, 5 wt. % W, 2 wt. % Ti, 5.5 wt. % Al, and the rest of Ni. After homogenizing the alloy ingot at 1250° C.×1 h, it was formed by isothermal forging at 1000° C., and the deformation was 80%. Afterwards, after holding at 800° C. for 16 hours, and tempering 1 hour at 350° C. after water quenching, the tensile properties of the alloy at room temperature to 800° C. were tested. The results were shown in Table 1.

TABLE 1

| High temperature mechanical properties of alloys | | | |
| --- | --- | --- | --- |
| Temperature/° C. | Tensile strength/MPa | Yield strength/MPa | Elongation/% |
| Room temperature | 1200 | 1100 | 8 |
| 500 | 1220 | 1120 | 9 |
| 800 | 1280 | 1150 | 9 |

Example 1

Figure 26:
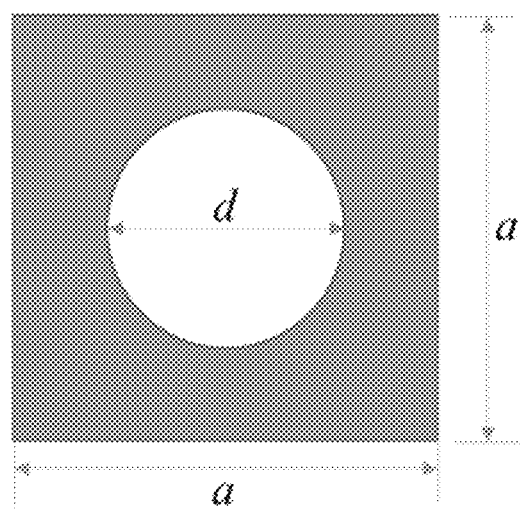
FIG. 26: A structure design drawing of the extrusion die used in continuous extrusion in Example 1 of the present invention. The ratio of the diameter d of the circular cavity to the side length a of the die (d/a) is <0.5.

Step 1: Batching and melting: performing batching according to the copper alloy composition of Cu-0.5 wt. % Ag, feeding into a melting furnace to fully melt, conduct sampling detection and analysis of oxygen content and alloying element content, and after supplementing and fully deoxidization to less than 10 ppm according to the analysis results, introducing the melt into the holding furnace through the melting furnace internal guide groove;

Step 2: Horizontal continuous casting: performing the horizontal continuous casting under the side of the holding furnace, installing two crystallizers under the side of the holding furnace at an interval of 400 mm, the crystallizers being provided with three groups of independent cooling units along the extraction direction of the primary billet, to allow the first group of cooling units to be closest to the holding furnace; adopting a reverse cooling method, making the temperature of the water inlet lower than 20° C., the water flow V3 of the third group of cooling units at 2000 L/min, the water flow V2 of the second group of cooling units at 2400 L/min, the water flow V1 of the first group of cooling units at 3000 L/min, providing electromagnetic induction coils on the outer walls of the water cooling jackets of the first and second groups of cooling units of the crystallizer to achieve electromagnetic stirring, the electromagnetic stirring method being rotary stirring, and the current frequency being 500 Hz; the primary billet cross-sectional area S being 2000 mm$^2$, and the extraction speed being 100 mm/min; carrying out water curtain spray within 1000 mm outside the outlet of the crystallizer, setting 90 atomizing nozzles at an interval of 10 mm, and the distance between the nozzle and the surface of the billet being 10 mm, and the water pressure being 0.8 MPa;

Step 3: Continuous extrusion: preheating the extrusion die to 500° C., the material of the extrusion die being the forged Ni-base superalloy prepared in Embodiment 0, with structure diagram as shown in FIG. 26; rapidly preheating the primary billets after horizontal continuous casting to 700° C. through an on-line induction device after removing the surface oxide defect layer by a peeling machine, then entering the cavity for extrusion, controlling the rotation speed of the extrusion wheel at 3 rpm, the extrusion ratio at 3, and the extrusion gap at 0.6 mm; performing a high-intensity cooling water spray at the outlet of the extrusion die, setting 100 atomizing nozzles at an interval of 10 mm, and the distance between the nozzle and the surface of the billet being 10 mm, and the water pressure being 0.8 MPa.

Step 4: Cold drawing: Carry out cold drawing of the billet after extrusion according to product requirements, the pass deformation of cold drawing being 5%, and the cumulative deformation being 50%.

Step 5: Aging treatment: coiling the billet after cold working and placing in a bell-type heating furnace for aging treatment, first placing the billet on the lining, and then hoisting to cover the lining after the heating furnace body reaches the preset temperature, quickly heating the billet, after reaching the preset holding time, lifting the furnace body by a crane to make the billet to cool down quickly, introducing the reducing atmosphere throughout the heat treatment process to avoid oxidation; determining the product aging temperature and time according to the following principles: taking billet samples in several groups, annealing at 300, 350, 400, 450, 500, 550, 600° C. for 0.1, 0.5, 1, 2, 4, 8, 16, 24, 48, 99.6 h respectively; testing the Vickers hardness (in unit of HV) and conductivity (in unit of % IACS) of the samples, and calculating the product of the hardness number and the conductivity value, and taking the test temperature of the sample with the largest product as the product annealing temperature, and taking the test time of the sample with the largest product plus 0.4 as the product annealing holding time. Results showed that the samples had the largest product value when annealing at 400° C. for 1 h, 400° C. was taken as the holding temperature of the product and 1.4 h was taken as the holding time of the product.

Step 6: Measuring the Vickers hardness of the obtained product using a Vickers hardness meter, and testing the product conductivity using an eddy current conductivity meter.

Figure 3:
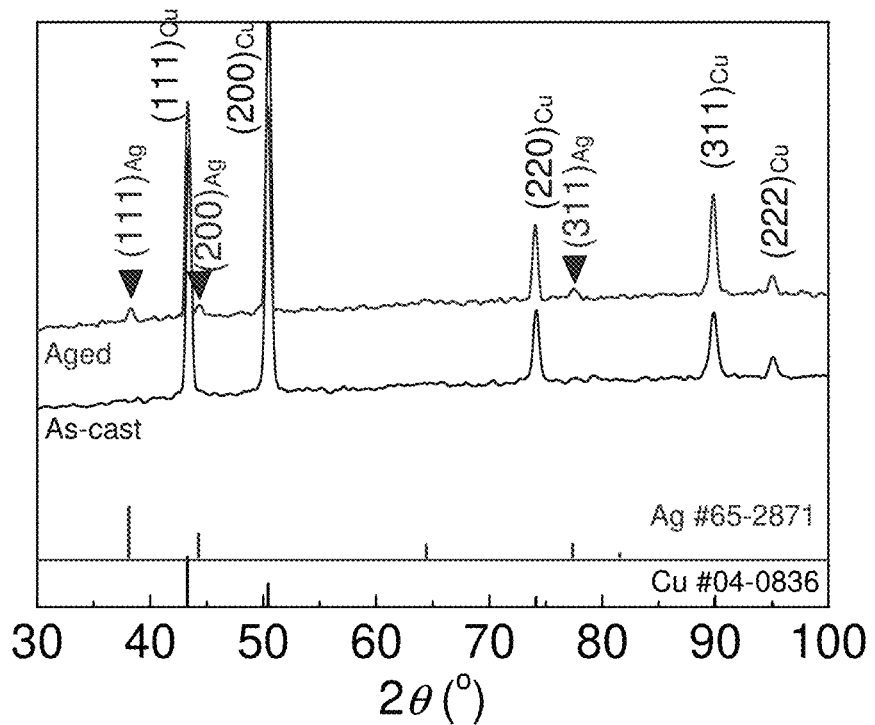
FIG. 3: An XRD patterns of the as-cast primary billet and aging state product of Example 1, showing the characteristics of the supersaturated solid solution microstructure of the as-cast primary billets and the Ag second phase precipitation microstructure of the aging state.
Figure 4:
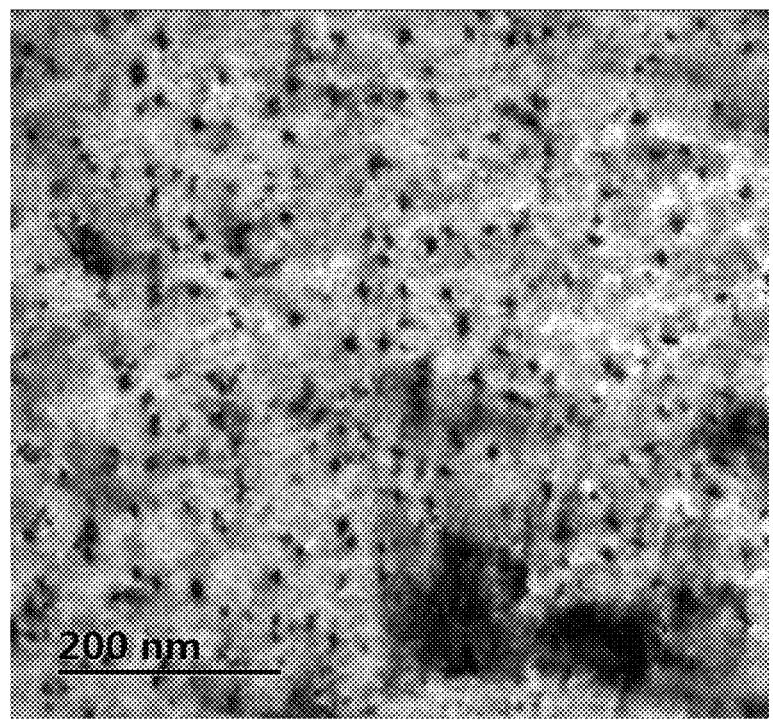
FIG. 4: A TEM photo of the copper alloy product of Example 4, showing a large number of fine Cr and Zr precipitated phase s in the Cu-0.7 wt. % Cr-0.15 wt. % Zr alloy product obtained by the method of the present invention.
Figure 5:
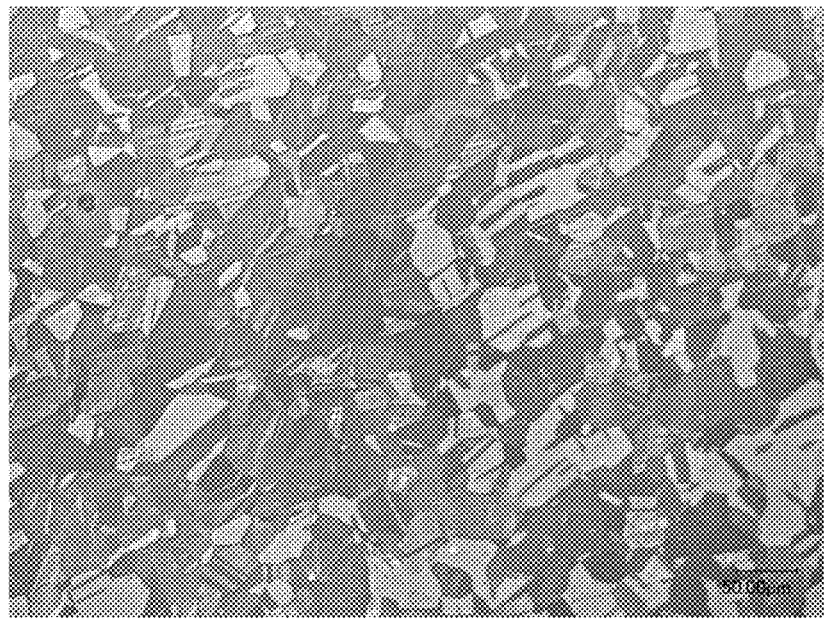
FIG. 5: A metallographic photo of the billet after continuous extrusion and cooling of Example 1, showing the recrystallized structure.
Figure 6:
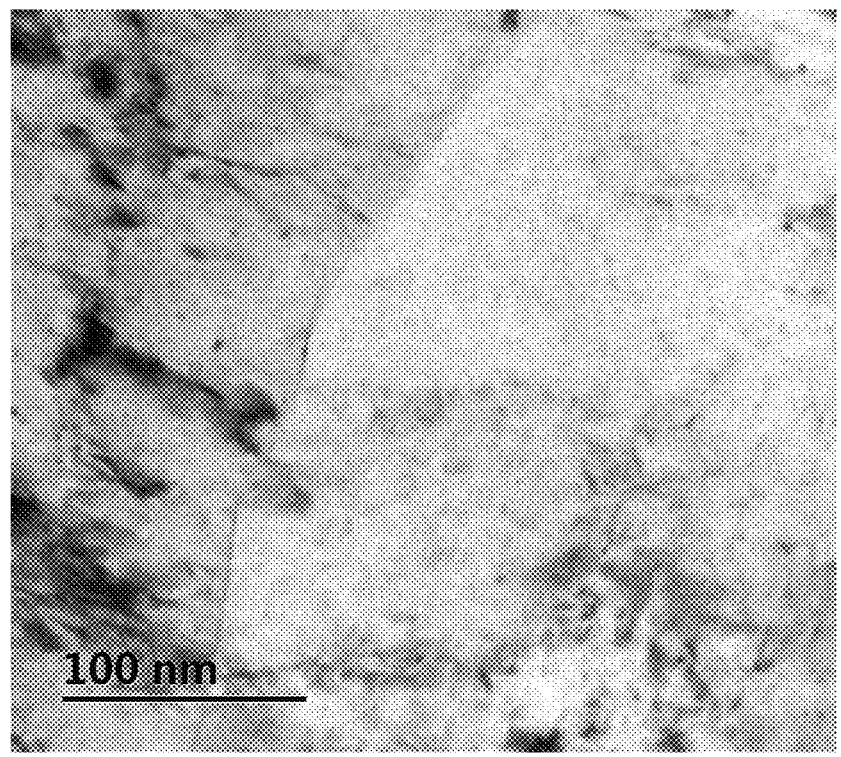
FIG. 6: A TEM photo of the billet after continuous extrusion and cooling of Example 1, showing that there is no nano-precipitated phase inside the extrusion state, indicating that the supersaturated solid solution characteristics are still maintained.

As shown from FIGS. 1 and 4, dispersed nano-precipitated phase and high-density dislocations were generated inside the copper alloy of this embodiment. As shown from FIG. 2, fine equiaxed grain structure of the as-cast state could be observed. As shown from FIG. 3, the second phase (Ag) was not detected in XRD of as-cast primary billet, while obvious second phase diffraction peaks were detected by XRD after aging, proving the supersaturated solid solution structure of the as-cast primary billet and the precipitated phase strengthened structure characteristics of the aging state. FIGS. 5 and 6 showed the recrystallized structure obtained in the extrusion state, and there was no second phase inside the grains, indicating that the supersaturated solid solution characteristics were still maintained.

Example 2

Step 2: Horizontal continuous casting: four crystallizers were used, with an interval of 200 mm, the water flow V3 of the third group of cooling units was 100 L/min, the water flow V2 of the second group of cooling units was 120 L/min, and the water flow V2 of the first group of cooling units was 150 L/min, the frequency of the electromagnetic stirring used was 2 Hz, the primary billet cross-sectional area was 50 mm$^2$, the extraction speed was 100 mm/min, 30 atomizing nozzles were set at an interval of 20 mm, the distance between the nozzle and the surface of the billet was 50 mm, and the water pressure was 0.5 MPa.

Step 3: continuous extrusion: the rotation speed of the extrusion wheel was 8 rpm, the extrusion ratio was 8, and the extrusion gap was 2 mm, 25 atomizing nozzles were set at an interval of 20 mm, the distance between the nozzle and the surface of the billet was 50 mm, and the water pressure was 0.5 MPa.

Step 4: Cold working: The pass deformation was 10%, and the cumulative deformation was 99%.

The rest of the steps and parameters were the same as those in Example 1.

Similar to Example 1, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Example 3

Step 1: batching and melting: the alloy composition of Cu-0.7 wt. % Cr-0.15 wt. % Zr.

Step 3: continuous extrusion: preheating the extrusion die to 600° C., rapidly preheating the primary billets to 700° C.

The rest of the steps and parameters were the same as those in Example 1.

Wherein, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Example 4

Step 1: batching and melting: the alloy composition of Cu-0.7 wt. % Cr-0.15 wt. % Zr.

Step 2: horizontal continuous casting: Three crystallizers were used, with an interval of 300 mm, the water flow V3 of the third group of cooling units was 200 L/min, the water flow V2 of the second group of cooling units was 240 L/min, the water flow V1 of the first group of cooling units was 300

L/min, the frequency of the electromagnetic stirring used was 50 Hz, the primary billet cross-sectional area was 200 mm², the extraction speed was 50 mm/min.

Step 3: continuous extrusion: the rotation speed of the extrusion wheel was 8 rpm, the extrusion ratio was 8, and the extrusion gap was 2 mm. Preheating the extrusion die to 600° C., rapidly preheating the primary billets to 700° C.

The rest of the steps and parameters were the same as those in Example 1.

Wherein, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained. As shown from FIG. 4, dispersed nano-precipitated phase and high-density dislocations were generated inside the copper alloy of this embodiment.

Example 5

Step 1: batching and melting: the alloy composition of Cu-3 wt. % Ni-1 wt. % Si.

Step 3: continuous extrusion: Preheating the extrusion die to 600° C., rapidly preheating the primary billets to 750° C.

The rest of the steps and parameters were the same as those in Example 1.

Wherein, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Example 6

Step 1: Batching and melting: the alloy composition of Cu-2 wt. % Fe-0.1 wt. % P.

Step 3: Continuous extrusion: Preheating the extrusion die to 550° C., rapidly preheating the primary billets to 700° C.

The rest of the steps and parameters were the same as those in Example 1.

Wherein, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

According to the results of Examples 1 to 6, this method is well suitable for common Cu-X binary alloys (such as Cu—Ag) and Cu-XY ternary alloys (such as Cu—Fe—P, Cu—Cr—Zr, Cu—Ni— Si). The prepared copper alloys have a fine and uniform nano-precipitated phase structure and high-strength and high-conductivity characteristics, with the comprehensive performance close to or superior to that of the products obtained by other technologies, and have a high yield and production capacity, which are very suitable for the mass production in the industry.

Example 7

Step 2: Horizontal continuous casting: Four crystallizers were used, with an interval of 200 mm, the water flow V3 of the third group of cooling units was 100 L/min, the water flow V2 of the second group of cooling units was 120 L/min, the water flow V1 of the first group of cooling units was 150 L/min, the frequency of the electromagnetic stirring used was 2 Hz, the primary billet cross-sectional area was 50 mm², the extraction speed was 200 mm/min, 30 atomizing nozzles were set at an interval of 10 mm, the distance between the nozzle and the surface of the billet was 10 mm, and the water pressure was 0.8 MPa.

Step 3: Continuous extrusion: The rotation speed of the extrusion wheel was 8 rpm, the extrusion ratio was 8, and the extrusion gap was 2 mm. The interval between atomizing nozzles was 20 mm, the distance between the nozzle and the surface of the billet was 50 mm, and the water pressure was 0.5 MPa.

Step 4: Cold working: The pass deformation was 10%, the cumulative deformation was 99%.

The rest of the steps and parameters were the same as those in Example 1.

The comparison between Example 1 and Example 7 showed that, if a higher extraction speed was used with a stronger spray cooling for a primary billet with a smaller cross-sectional area, although the cooling effect was enhanced and the solid solution was more sufficient, it would cause too fast solidification and generate broken billets (FIG. 7), which would greatly damage the continuity of production.

Example 8

Step 2: Horizontal continuous casting: the frequency of the electromagnetic stirring used was 2 Hz, the extraction speed was 50 mm/min, and the water pressure was 0.2 MPa.

The rest of the steps and parameters were the same as those in Example 1.

The comparison between Example 1 and Example 8 showed that, if the extraction speed was low, the frequency of the electromagnetic stirring was low and the cooling water pressure was low, it would cause insufficient stirring of copper alloy melts, and fine equiaxed grains would not be formed. Some Ag atoms would be precipitated from the supersaturated solid solution in advance, to evolve into coarse primary phase (FIG. 8), which would weaken the strength of the alloy, and at the same time lead to insufficient precipitation subsequently and damage the alloy's conductivity. Therefore, process parameters such as the extracted cross-sectional area, extraction speed, cooling water pressure, and electromagnetic stirring frequency must be reasonably matched.

Example 9

Step 3: The die material used for continuous extrusion was Cr12MoV die steel.

The rest of the steps and parameters were the same as those in Example 1.

Figure 9:
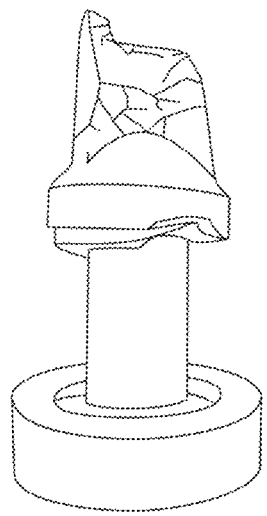
FIG. 9: A schematic illustration of the invalid extrusion die of Example 9, showing that the die steel with excellent high temperature mechanical properties must be used.

The comparison between Example 1 and Example 9 showed that, if the extrusion dies used an ordinary die steel, the die would be replaced frequently, which would seriously damage the production rhythm, reduce the production capacity and lead to increased wastes. FIG. 9 showed a scrapped common die steel plug component.

Example 10

Step 3: The induction preheating temperature for continuous extrusion primary billet was 500° C.

The rest of the steps and parameters were the same as those in Example 1.

Example 11

Step 3: The interval of atomizing nozzles for water cooling spray at the continuous extrusion outlet was 30 mm, 20 nozzles were set, the distance between the nozzle and the surface of the billet was 80 mm, and the water pressure was 0.2 MPa.

The rest of the steps and parameters were the same as those in Example 1.

Figure 10:
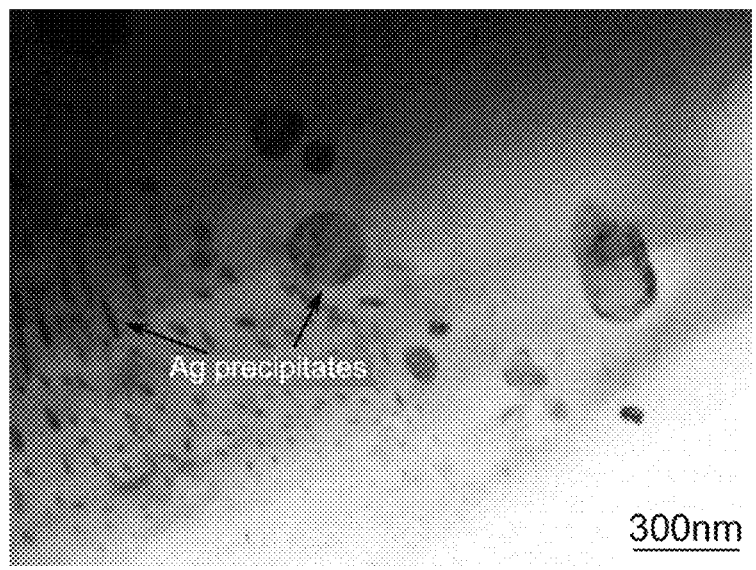
FIG. 10: A TEM photo of the billet after continuous extrusion and cooling of Example 11, showing that the supersaturated solid solution precipitates uneven coarse Ag phase in advance due to insufficient cooling after extrusion.

The comparison between Examples 1, 10 and 11 showed that, if the preheating temperature of the primary billet was low during the continuous extrusion process, or the cooling effect of the billets at the extrusion outlet was insufficient, it would decrease the comprehensive properties such as product strength and conductivity. The reason was that the early precipitation decomposition of the supersaturated solid solution generated a coarse and uneven precipitated phase (FIG. 10).

Example 12

Step 3: Preheating the continuous extrusion die to 425° C.
The rest of the steps and parameters were the same as those in Example 1.

The comparison between Example 1 and Example 12 showed that, if the preheating temperature of the die was not enough in the continuous extrusion process, it would cause the performance of the product manufactured at the early stage of extrusion not to reach the level of 120HV&95% IACS. The reason was that the cavity temperature in the initial stage of extrusion was low, and the precipitation decomposition of the supersaturated solid solution occurred in advance; and the extrusion stress was too large, resulting in a reduction in the life of the die.

Example 13

Step 3: The extrusion ratio of continuous extrusion was 1.
The rest of the steps and parameters were the same as those in Example 1.

The comparison between Example 1 and Example 13 showed that if the extrusion ratio in the continuous extrusion process was too low, the material deformation would be insufficient and the material would not be effectively strengthened, resulting in low strength of product, and slightly lower extrusion temperature. The precipitation decomposition of part of the supersaturated solid solution occurred in advance, which slightly damaged the conductivity.

Example 14

Step 3: The continuous extrusion ratio was 9.
The rest of the steps and parameters were the same as those in Example 1.

The comparison between Example 1 and Example 14 showed that if the extrusion ratio in the continuous extrusion process was too high, although the product strength could be further increased, multiple jamming and die rupture accidents occurred, seriously damaging equipment life and productivity.

Example 15

Step 4: The cumulative deformation during cold working was 30%.
The rest of the steps and parameters were the same as those in Example 1.

The comparison between Example 1 and Example 15 showed that, if the cumulative deformation during cold working was smaller, the hardening effect on copper alloy was weak, the dislocation density was not high, and the precipitation kinetic was weak, thus, both the hardness and the conductivity were slight lower.

Example 16

Step 5: Aging treatment: The sample was annealed at 400° C., holding for 1 h.
The rest of the steps and parameters were the same as those in Example 1.

The comparison between Example 1 and Example 16 showed that, if the holding time of aging annealing was not added 0.4 h required in the invention, the alloying element could not be fully aging-precipitated, resulting in slightly low conductivity. The additional 0.4 h was a detailed consideration of the difference in the heating and uniform temperature characteristics between the large furnace and the small samples.

Example 17

Step 2: The water flow V3 of the third group of cooling units was 4000 L/min, the water flow V3 of the second group of cooling units was 4800 L/min, the water flow V1 of the first group of cooling units was 6000 L/min.
The rest of the steps and parameters were the same as those in Example 1.

Example 18

Step 2: The water flow V3 of the third group of cooling units was 1000 L/min, the water flow V3 of the second group of cooling units was 1200 L/min, the water flow V1 of the first group of cooling units was 1500 L/min.
The rest of the steps and parameters were the same as those in Example 1.

Example 19

Step 2: The water flow V3 of the third group of cooling units was 6000 L/min, the water flow V3 of the second group of cooling units was 7200 L/min, the water flow V1 of the first group of cooling units was 12000 L/min.
The rest of the steps and parameters were the same as those in Example 1.

Example 20

Step 2: The water flow V3 of the third group of cooling units was 500 L/min, the water flow V3 of the second group of cooling units was 600 L/min, the water flow V1 of the first group of cooling units was 1000 L/min.
The rest of the steps and parameters were the same as those in Example 1.

The comparisons of Examples 1, 17, 18, 19 and 20 showed that, a good high-strength and high-conductivity copper alloy could be obtained when the water flow of the three groups of cooling units of the crystallizer was within the range determined by the technical principles disclosed in the present invention. When the water flow was too high (Example 19), due to excessive cooling, the metal directly solidified on the inner wall of the crystallizer, causing it to be stuck and unable to be extracted normally. When the water flow was too low (Example 20), due to insufficient cooling, it was impossible to ensure that the primary billet was in a solid solution state, and part of Ag was precipitated in advance, making the strength and conductivity to be low.

Example 21

Step 2: The water flow V3 of the third group of cooling units was 2000 L/min, the water flow V3 of the second group of cooling units was 2000 L/min, the water flow V1 of the first group of cooling units was 2000 L/min.

The rest of the steps and parameters were the same as those in Example 1.

The comparison between Example 1 and Example 21 showed that, when the water flow of the three groups of cooling units of the crystallizer was not set according to the ratio disclosed in the present invention, a reasonable cooling gradient could not be formed in the three groups of cooling units, resulting in serious abrasion of the inner wall of the crystallizer and reduced service life by 50%.

Example 22

Step 3: The outlet of continuous extrusion adopted immersed cooling with water tank instead of spraying water cooling with atomization.

The rest of the steps and parameters were the same as those in Example 1.

Figure 11:
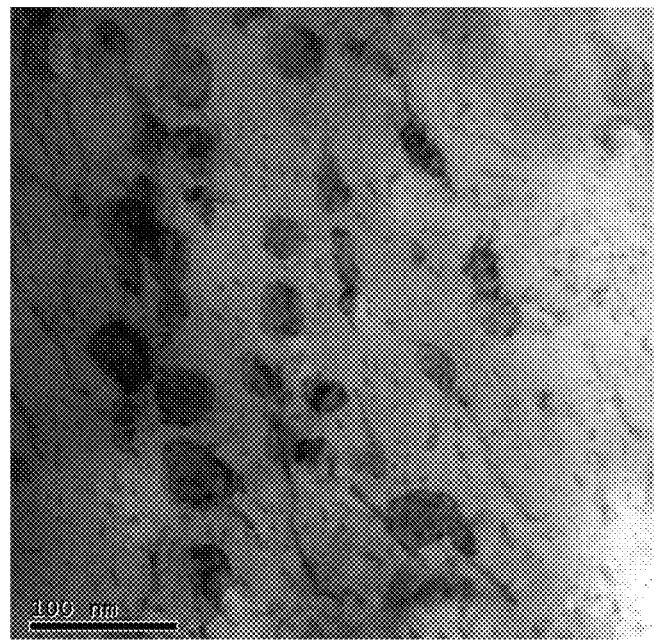
FIG. 11: A TEM photo of the billet after continuous extrusion and cooling of Example 22. It is observed that Ag precipitated phase has appeared in the microstructure, indicating that the solid solution has been partially precipitated.

The comparison between Example 1 and Example 22 showed that, when no strong cooling method was used after continuous extrusion, for example, the conventional cooling with water tank immersion used in Example 22, it was prone to cause partial precipitation of the solid solution, low strength, and weak precipitation kinetic. As shown in FIG. 11, the TEM after continuous extrusion and cooling of samples of Example 22 showed that Ag precipitated phase appeared in the structure, indicating that the solid solution had been partially precipitated.

Example 23

Step 2: The primary billet spraying adopted conventional small-hole spraying, 90 nozzles were set, with an interval of 30 mm, the distance between the nozzle and the surface of the billet was 60 mm, and the water pressure was 0.3 MPa.

The rest of the steps and parameters were the same as those in Example 1.

The comparison between Example 1 and Example 23 showed that, when the primary billet was continuously extracted, if no strong cooling method was used, for example, the conventional small hole spray used in Example 23 and unreasonable water pressure and hole spacing, it would easily lead to partial precipitation of the solid solution, slightly low strength, and weak precipitation kinetic.

Example 24

Step 2: Performing high temperature solid solution after conventional horizontal continuous casting. The temperature of the holding furnace was controlled at 1250° C. The crystallizer adopted a conventional water-cooled crystallizer with a copper inner wall steel sleeve containing only one water cooling unit. The cooling water flow used selected the conventional parameters of 50 L/min, the traction speed was 10 mm/s, and the copper alloy rod was obtained by casting. The copper alloy rod produced by horizontal continuous casting was subjected to solid solution treatment, and the solid solution treatment temperature was 900° C., the heating method was on-line induction heating, the treatment time was 40 min, and the quenching adopted conventional small hole spraying, and 90 nozzles were set, with an interval of 30 mm. The distance between the nozzle and the surface of the billet was 60 mm, and the water pressure was 0.3 MPa.

The rest of the steps and parameters were the same as those in Example 1.

The comparison between Example 1 and Example 24 showed that, compared with the conventional horizontal continuous casting+high-temperature solid solution technology, the horizontal continuous casting of the present invention significantly improved the product hardness and conductivity, and did not require a high-temperature solid solution step with extremely high energy consumption.

TABLE 2

Summary of product performance, yield rate, and production capacity of the examples

Figure 2:
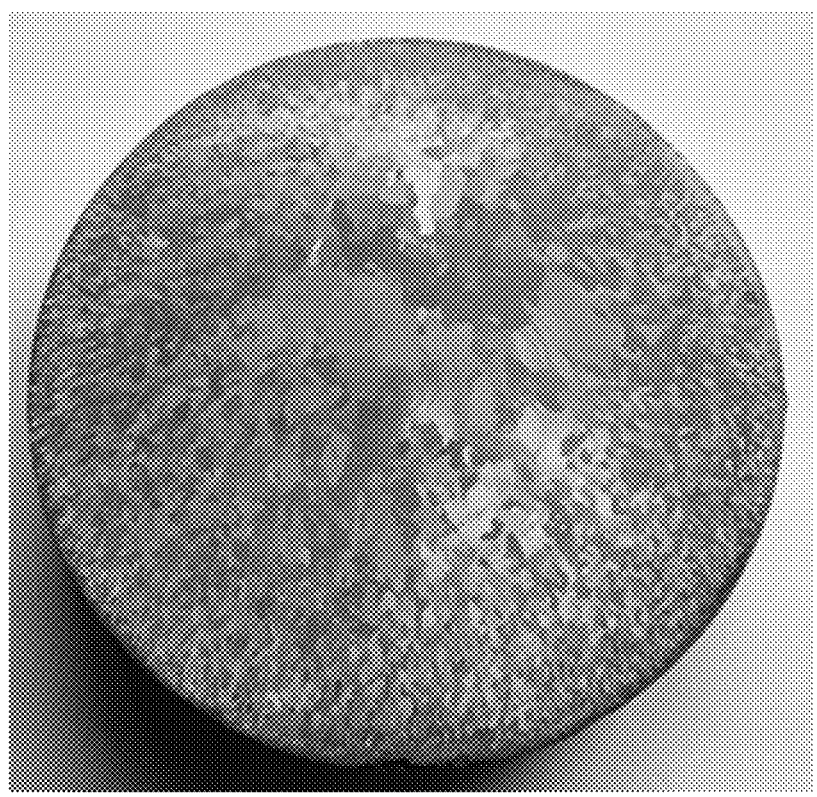
FIG. 2: A cross-sectional metallographic photo of an as-cast primary billet obtained by horizontal continuous casting of Example 1, showing a Cu-0.5 wt. % Ag alloy cast equiaxed grains structure obtained by the method of the present invention.
Figure 7:
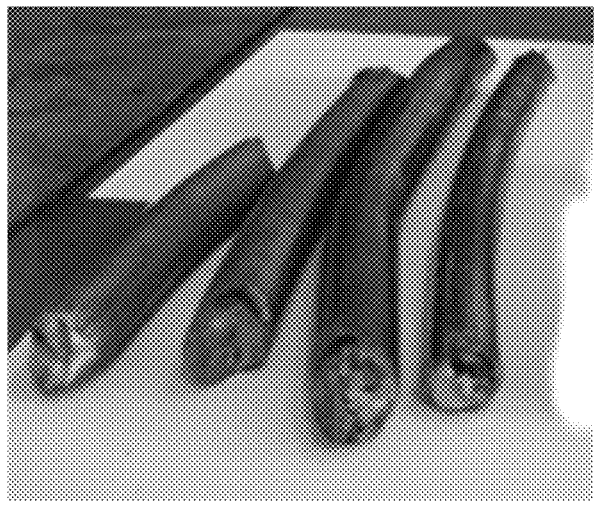
FIG. 7: An actual photo of multiple broken billets after horizontal continuous casting of Example 7, showing that the unreasonable continuous casting process causes billet breakage.
Figure 8:
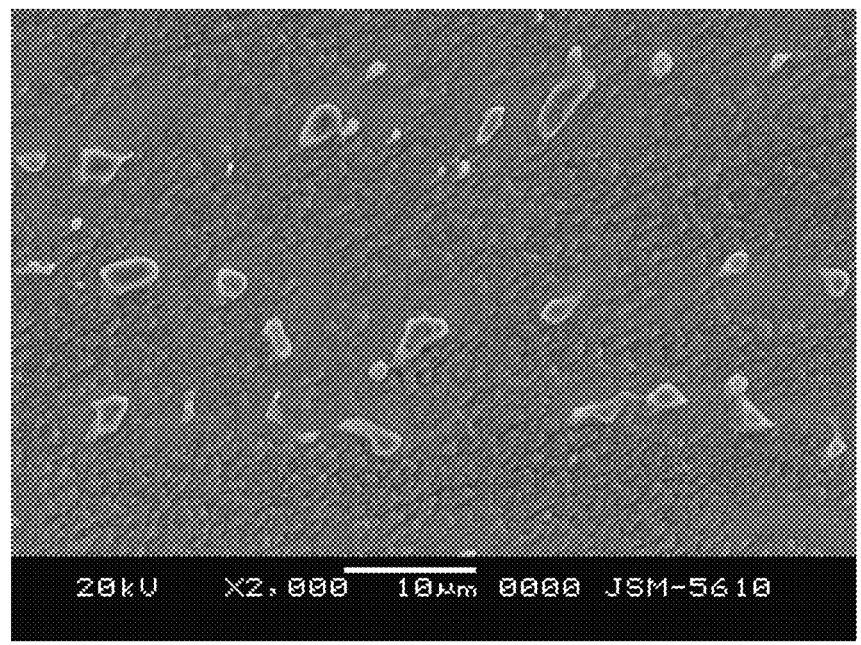
FIG. 8: A TEM photo of primary billet after horizontal continuous casting of Example 8, showing the premature precipitation of Ag phase due to insufficient cooling.

| Example | Alloy | Vickers hardness (HV) | Conductivity (% IACS) | Yield rate | Production capacity * (tons/day) | Remarks |
|---|---|---|---|---|---|---|
| Example 1 | Cu-0.5 wt. % Ag | 120 | 95 | 98% | 190 | The fine and dense precipitated phase was shown in FIG. 1, the metallographic photo of equiaxed grain was shown in FIG. 2, and the XRD pattern of the as-cast and aging state was shown in FIG. 3. |
| Example 2 | Cu-0.5 wt. % Ag | 140 | 93 | 97% | 9.6 | |
| Example 3 | Cu-0.7 wt. % Cr-0.15 wt. % Zr | 200 | 86 | 92% | 190 | |
| Example 4 | Cu-0.7 wt. % Cr-0.15 wt. % Zr | 220 | 83 | 91% | 14.4 | The fine and dense precipitated phase was shown in FIG. 4. |
| Example 5 | Cu-3 wt. % Ni-1 wt. % Si | 230 | 58 | 96% | 190 | The metallographic structure after extrusion and cooling was shown in FIG. 5, and no precipitated phase was observed in the TEM test, as shown in FIG. 6. |
| Example 6 | Cu-2 wt. % Fe-0.1 wt. % P | 180 | 40 | 97% | 190 | |
| Example 7 | Cu-0.5 wt. % Ag | 150 | 92 | 62% | 4.6 | A high rate of extracted broken billets, and the photo of broken billets was shown in FIG. 7. |
| Example 8 | Cu-0.5 wt. % Ag | 100 | 76 | 72% | 92 | Low performance, the photo of precipitation in advance was shown in FIG. 8. |
| Example 9 | Cu-0.5 wt. % Ag | 120 | 95 | 75% | 61 | The average service life of the extrusion die was less than 5 tons, and the failure status was shown in FIG. 9. |
| Example 10 | Cu-0.5 wt. % Ag | 103 | 90 | 98% | 190 | The supersaturated solid solution decomposed in advance, resulting in a coarse and uneven precipitated phase, as shown in FIG. 10. |
| Example 11 | Cu-0.5 wt. % Ag | 101 | 91 | 98% | 190 | |
| Example 12 | Cu-0.5 wt. % Ag | 120 | 95 | 98% | 176 | The performance of the products manufactured in the early stage of extrusion did not reach the level of 120HV&95% IACS, and the die life was relatively short. |

TABLE 2-continued

Summary of product performance, yield rate, and production capacity of the examples

| Example | Alloy | Vickers hardness (HV) | Conductivity (% IACS) | Yield rate | Production capacity * (tons/day) | Remarks |
|---|---|---|---|---|---|---|
| Example 13 | Cu-0.5 wt. % Ag | 85 | 94 | 98% | 190 | The product strength was slightly low. |
| Example 14 | Cu-0.5 wt. % Ag | 130 | 95 | 52% | 81 | Multiple jamming, die breakage. |
| Example 15 | Cu-0.5 wt. % Ag | 80 | 92 | 98% | 190 | Low strength, weak precipitation kinetic. |
| Example 16 | Cu-0.5 wt. % Ag | 120 | 93 | 98% | 190 | Slightly low conductivity. |
| Example 17 | Cu-0.5 wt. % Ag | 120 | 95 | 98% | 190 | |
| Example 18 | Cu-0.5 wt. % Ag | 120 | 95 | 98% | 190 | |
| Example 19 | Cu-0.5 wt. % Ag | / | / | / | / | The crystallizer was stuck and could not extract the primary billets. |
| Example 20 | Cu-0.5 wt. % Ag | 105 | 91 | 98% | 190 | Insufficient cooling, partial precipitation, low strength, weak precipitation kinetic of solid solution. |
| Example 21 | Cu-0.5 wt. % Ag | 120 | 95 | 98% | 125 | Unreasonable cooling gradient, serious wear on the inner wall of the crystallizer, and a 50% reduction in service life. |
| Example 22 | Cu-0.5 wt. % Ag | 95 | 89 | 98% | 190 | Insufficient cooling, partial precipitation, low strength, weak precipitation kinetic of solid solution. FIG. 11. |
| Example 23 | Cu-0.5 wt. % Ag | 100 | 89 | 98% | 190 | Insufficient cooling of primary billet, partial precipitation, low strength, weak precipitation kinetic of solid solution. |
| Example 24 | Cu-0.5 wt. % Ag | 100 | 87 | 98% | 190 | Weak precipitation kinetic, low strength, slightly low conductivity, high energy consumption. |

* Only the production capacity of one set of horizontal continuous casting + continuous extrusion production line was counted.

Example 25

Step 1: Batching and melting: performing batching according to the copper alloy composition of Cu-0.5 wt. % Cr-0.1 wt. % Zr, feeding into a melting furnace to fully melt, conduct sampling detection and analysis of oxygen content and alloying element content, and after supplementing and fully deoxidization to less than 10 ppm according to the analysis results, introducing the melt into the holding furnace through the melting furnace internal guide groove;

Step 2: Horizontal continuous casting: performing the horizontal continuous casting under the side of the holding furnace, installing four crystallizers under the side of the holding furnace at an interval of 200 mm, the crystallizers being provided with three groups of independent cooling units along the extraction direction of the primary billet, to allow the first group of cooling units to be closest to the holding furnace; adopting a reverse cooling method, making the temperature of the water inlet lower than 20° C., the water flow V3 of the third group of cooling units at 50 L/min, the water flow V2 of the second group of cooling units at 60 L/min, the water flow V1 of the first group of cooling units at 75 L/min, providing electromagnetic induction coils on the outer walls of the water cooling jackets of the first and second groups of cooling units of the crystallizer to achieve electromagnetic stirring, the electromagnetic stirring method being rotary stirring, and the current frequency being 2 Hz; the primary billet cross-sectional area S being 50 mm², and the extraction speed being 100 mm/min; carrying out water curtain spray within 1000 mm outside the outlet of the crystallizer, setting 30 atomizing nozzles at an interval of 20 mm, and the distance between the nozzle and the surface of the billet being 50 mm, and the water pressure being 0.5 MPa.

Figure 25:
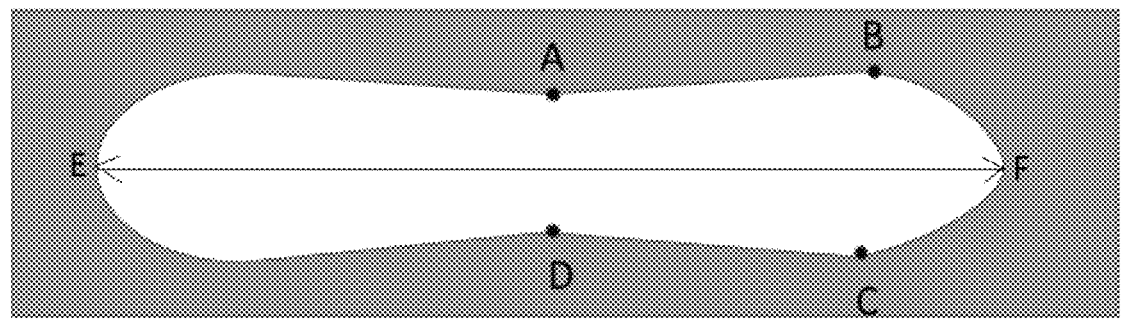
FIG. 25: A structure design drawing of the extrusion die used in continuous extrusion in Example 25 of the present invention. It is a symmetrical structure. The angle between AB line and AD line is 105°, and the angle between CD line and DA line is also 105°. The diameter of the right semicircle of BC is the length of the BC line segment.

Step 3: Continuous extrusion: preheating the extrusion die to 500° C., the material of the extrusion die being the forged Ni-base superalloy prepared in Embodiment 0, with structure diagram as shown in FIG. 25; rapidly preheating the primary billets after horizontal continuous casting to 800° C. through an on-line induction device after removing the surface oxide defect layer by a peeling machine, then entering the cavity for extrusion, controlling the rotation speed of the extrusion wheel at 8 rpm, the extrusion ratio at 8, and the extrusion gap at 2 mm; performing a high-intensity cooling water spray at the outlet of the extrusion die, setting 20 atomizing nozzles at an interval of 20 mm, and the distance between the nozzle and the surface of the billet being 50 mm, and the water pressure being 0.5 MPa.

Step 4: Cold rolling: Carry out cold rolling of the billet after extrusion according to product requirements, the pass deformation of cold drawing being 5%, and the cumulative deformation being 99%.

Step 5: Aging treatment: coiling the billet after cold working and placing in a bell-type heating furnace for aging treatment, first placing the billet on the lining, and then hoisting to cover the lining after the heating furnace body reaches the preset temperature, quickly heating the billet, after reaching the preset holding time, lifting the furnace body by a crane to make the billet to cool down quickly, introducing the reducing atmosphere throughout the heat treatment process to avoid oxidation; determining the product aging temperature and time according to the following principles: taking billet samples in several groups, annealing at 300, 350, 400, 450, 500, 550, 600° C. for 0.1, 0.5, 1, 2, 4, 8, 16, 24, 48, 99.6 h respectively; testing the Vickers hardness (in unit of HV) and conductivity (in unit of % IACS) of the samples, and calculating the product of the hardness number and the conductivity value, and taking the test temperature of the sample with the largest product as the product annealing temperature, and taking the test time of the sample with the largest product plus 0.4 as the product annealing holding time. Results showed that the samples had the largest product value when annealing at 500° C. for 1 h, 500° C. was taken as the holding temperature of the product and 1.4 h was taken as the holding time of the product.

Step 6: Measuring the Vickers hardness of the obtained product using a Vickers hardness meter, and testing the product conductivity using an eddy current conductivity meter. Results were shown in Table 3.

Figure 12:
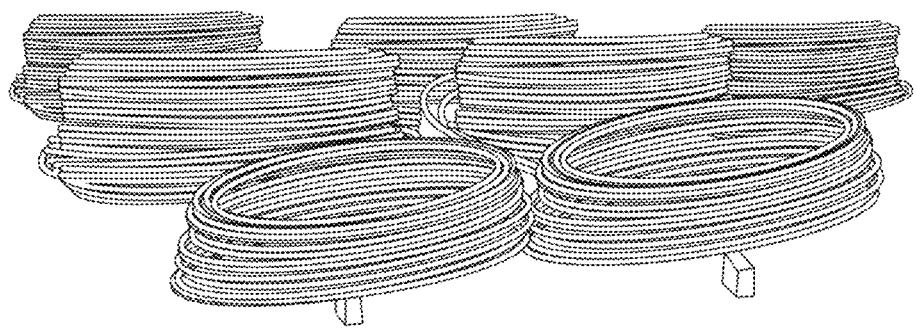
FIG. 12: A schematic illustration of the primary billet extracted from the horizontal continuous casting of Example 25.
Figure 13:
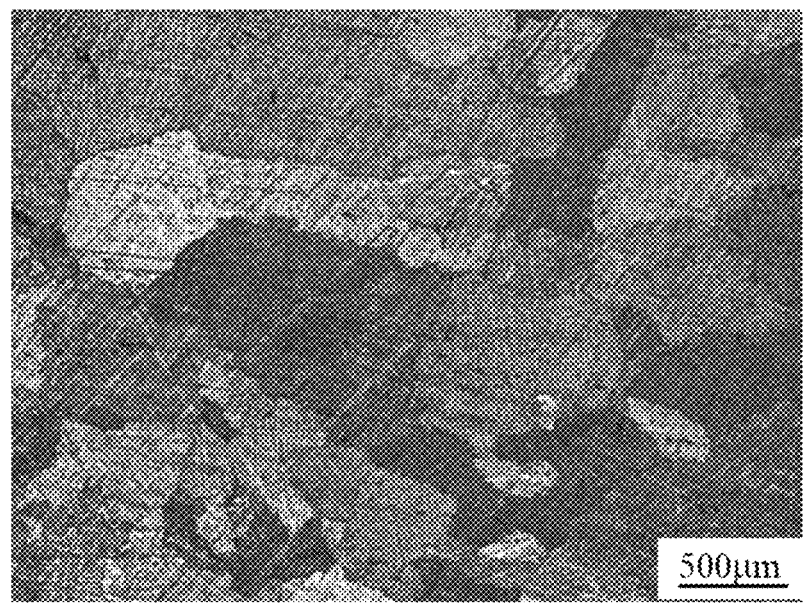
FIG. 13: A photo of low-magnification metallographic structure of the primary billet extracted from the horizontal continuous casting of Example 25.
Figure 14:
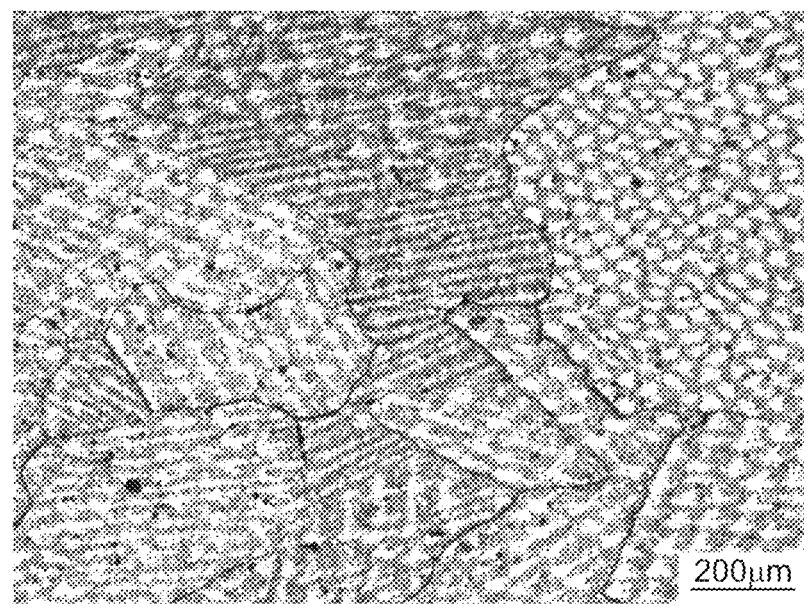
FIG. 14: A photo of high-magnification metallographic structure of the primary billet extracted from the horizontal continuous casting of Example 25, without obvious precipitated phase inside the grains.
Figure 15:
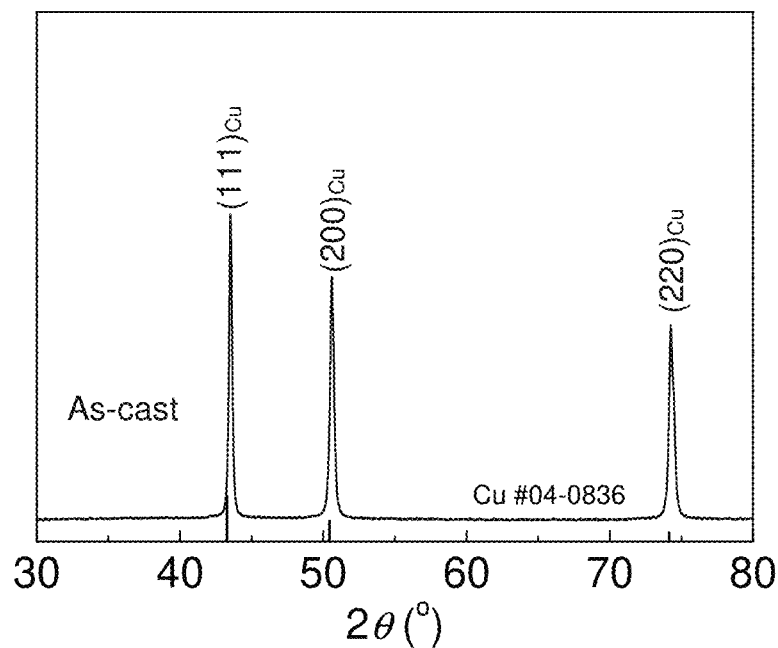
FIG. 15: An XRD pattern of the primary billet extracted from the horizontal continuous casting of Example 25. There is only the diffraction peak of copper, but the second phase diffraction peak is not seen. The peak position of the diffraction peak is shifted from that of the standard copper diffraction peak, indicating that the chromium and zirconium elements are solid-dissolved in the copper lattices.
Figure 16:
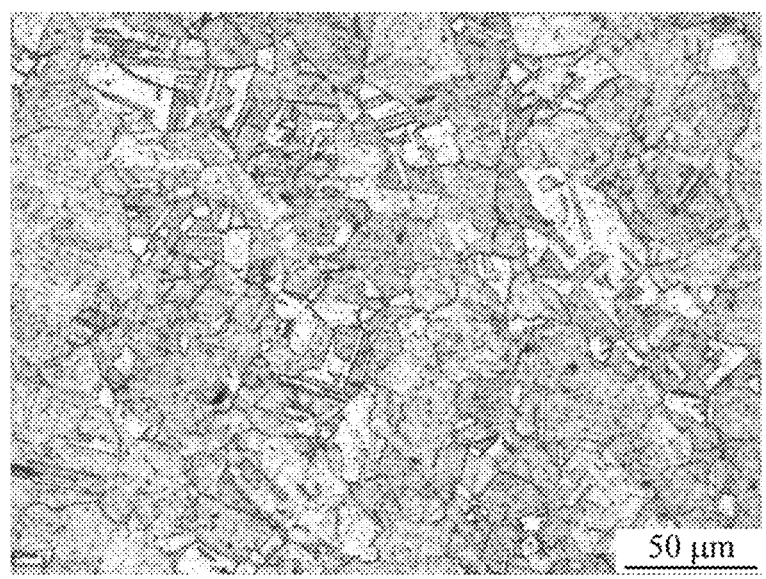
FIG. 16: A photo of the metallographic structure of the billet after continuous extrusion of Example 25, showing the equiaxed grain microstructure.
Figure 17:
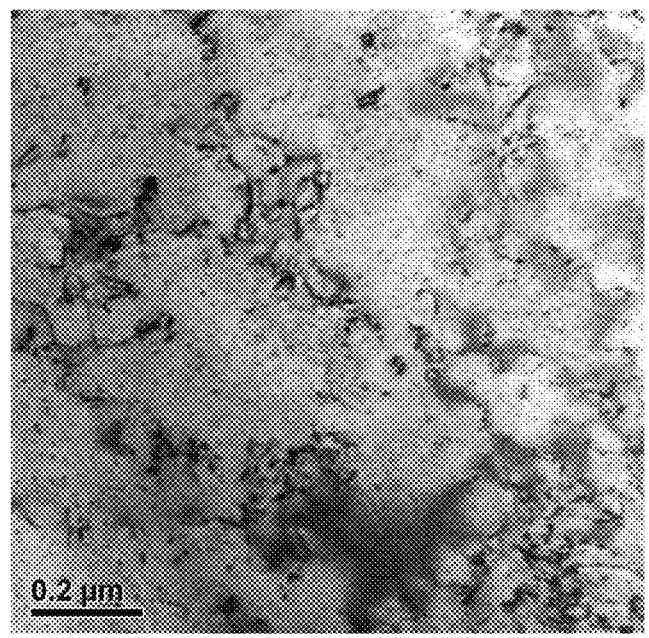
FIG. 17: A TEM photo of billets after continuous extrusion and cooling of Example 25, showing that there is no nano-precipitated phase inside the extrusion state, indicating that the characteristics of supersaturated solid solution are still maintained.
Figure 18:
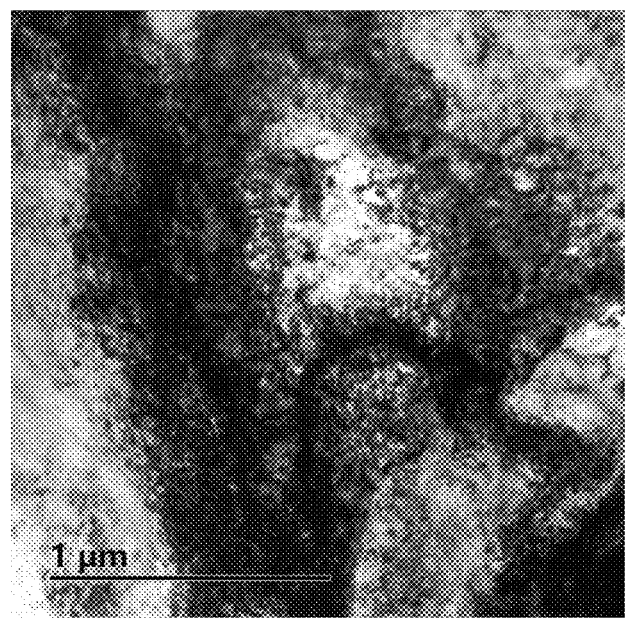
FIG. 18: A TEM structure photo of billets after cold rolling of Example 25, showing high-density dislocation tangle.
Figure 19:
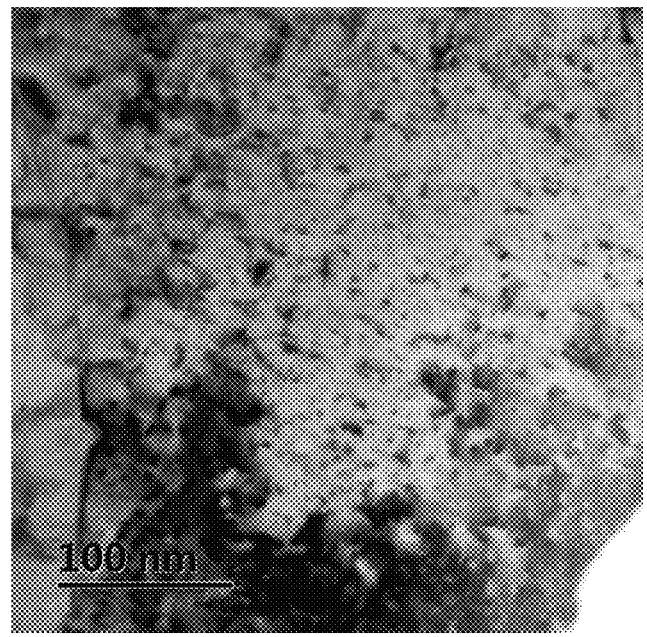
FIG. 19: A TEM structure photo of the sample after the aging treatment of Example 25, showing the high-density precipitated phase.
Figure 20:
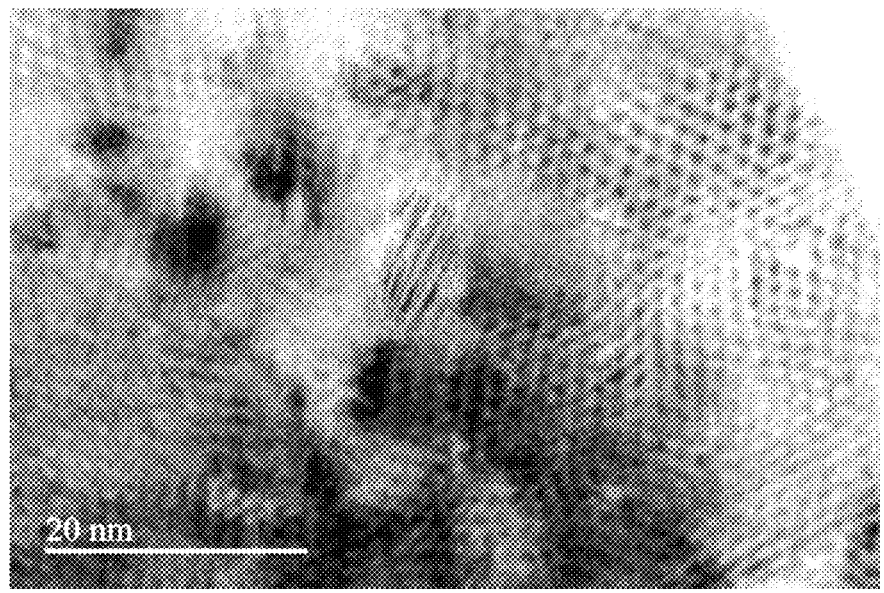
FIG. 20: A high-resolution TEM structure photo of the sample after the aging treatment of Example 25, showing the lattice fringe image of the nano-precipitated phase.

FIG. 12 showed the primary billet rod obtained by horizontal continuous casting in this embodiment. The metallographic structure photos in FIGS. 13 and 14 showed no obvious precipitated phase inside the grains. The XRD pattern in FIG. 15 only showed the diffraction peak of copper, but the second phase diffraction peak was not seen. The peak position of the diffraction peak was shifted from that of the standard copper diffraction peak, indicating that the chromium and zirconium elements were solid-dissolved in the copper lattices. FIG. 16 showed the equiaxed grain structure of samples after continuous extrusion. The TEM photo of billets after extrusion and cooling in FIG. 17 showed there was no nano-precipitated phase inside the extrusion state, indicating that the supersaturated solid solution characteristics were still maintained. FIG. 18 showed the high-density dislocation tangle existing in the samples in cold rolling state. FIG. 19 showed the high-density precipitated phase appearing inside the samples in aging state. The high-resolution TEM photo in FIG. 20 showed the lattice fringe image of the nano-precipitated phase.

Example 26

Step 1: Batching and melting. the alloy composition of Cu-1 wt. % Cr-0.15 wt. % Zr.

The rest of the steps and parameters were the same as those in Example 25.

Similar to Example 25, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Example 27

Step 1: Batching and melting. the alloy composition of Cu-0.5 wt. % Cr-0.1 wt. % Zr-0.05 wt. % Si.

The rest of the steps and parameters were the same as those in Example 25.

Similar to Example 25, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Example 28

Step 1: Batching and melting. the alloy composition of Cu-0.5 wt. % Cr-0.1 wt. % Zr-0.03 wt. % Mg.

The rest of the steps and parameters were the same as those in Example 25.

Similar to Example 25, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Through comparative analysis of the results of Examples 25 to 28, this method is well suitable for typical copper-chromium-zirconium ternary alloys and alloys further microalloyed on the basis of copper-chromium-zirconium. The prepared copper-chromium-zirconium strips have a fine and uniform nano-precipitated phase structure and high-strength and high-conductivity characteristics, with the comprehensive performance close to or superior to that of the products obtained by other technologies, and have a high yield, which are very suitable for the mass production in the industry.

Example 29

Step 2: Horizontal continuous casting. Two crystallizers were used, with an interval of 400 mm, the water flow V3 of the third group of cooling units was 500 L/min, the water flow V2 of the second group of cooling units was 600 L/min, the water flow V1 of the first group of cooling units was 750 L/min, the frequency of the electromagnetic stirring used was 500 Hz, the primary billet cross-sectional area was 1000 mm$^2$, the extraction speed was 100 mm/min, 90 atomizing nozzles were set, with an interval of 10 mm, the distance between the nozzle and the surface of the billet was 为 10 mm, and the water pressure was 0.8 MPa.

Step 3: Continuous extrusion. the rotation speed of the extrusion wheel was 3 rpm, the extrusion ratio was 3, and the extrusion gap was 0.6 mm. 50 atomizing nozzles were set, with an interval of 10 mm, the distance between the nozzle and the surface of the billet was 10 mm, and the water pressure was 0.8 MPa.

The rest of the steps and parameters were the same as those in Example 25.

Wherein, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Example 30

Step 1: Three crystallizers were used, with an interval of 300 mm, the water flow V3 of the third group of cooling units was 100 L/min, the water flow V2 of the second group of cooling units was 120 L/min, the water flow V1 of the first group of cooling units was 150 L/min, the frequency of the electromagnetic stirring used was 50 Hz, the primary billet cross-sectional area was 200 mm$^2$, the extraction speed was 50 mm/min, Step 3: Continuous extrusion. The rotation speed of the extrusion wheel was 8 rpm, the extrusion ratio was 8, and the extrusion gap was 2 mm. Preheating the extrusion die to 600° C., rapidly preheating the primary billets to 700° C.

The rest of the steps and parameters were the same as those in Example 25.

Wherein, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Example 31

Step 3: Continuous extrusion. Preheating the extrusion die to 550° C., rapidly preheating the primary billets to 750° C.

The rest of the steps and parameters were the same as those in Example 25.

Wherein, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Example 32

Step 4: Cold rolling the cumulative deformation was 50%.

The rest of the steps and parameters were the same as those in Example 25.

Wherein, the XRD patterns showed the as-cast primary billet had a supersaturated solid solution structure. The TEM photo of the billet after extrusion and cooling showed there was no nano-precipitated phase inside the extrusion state, indicating that the supersaturated solid solution characteristics were still maintained.

Example 33

Step 2: horizontal continuous casting. the frequency of the electromagnetic stirring used was 1 Hz, the extraction speed was 2 mm/min, and the water pressure was 0.2 MPa.

The rest of the steps and parameters were the same as those in Example 25.

The comparison between Example 25 and Example 33 showed that, if the extraction speed was low, the frequency of the electromagnetic stirring was low and the cooling water pressure was low, it would cause insufficient stirring of copper-chromium-zirconium strip melts, and fine equi-axed grains would not be formed. Some Ag atoms would be precipitated from the supersaturated solid solution in advance, to evolve into coarse primary phase (FIG. 22), which would weaken the strength of the alloy, and at the same time lead to insufficient precipitation subsequently and damage the alloy's conductivity.

Example 34

Step 2: Horizontal continuous casting. the extraction speed was 400 mm/min, and the water pressure was 1.0 MPa.

The rest of the steps and parameters were the same as those in Example 25.

The comparison between Example 25 and Example 34 showed that, if a higher extraction speed was used with a stronger spray cooling for a primary billet with a smaller cross-sectional area, although the cooling effect was enhanced and the solid solution was more sufficient, it would cause too fast solidification and generate broken billets (FIG. 23), which would greatly damage the continuity of production.

The comparisons between Examples 25, 33 and 34 showed that, process parameters such as the extracted cross-sectional area, extraction speed, cooling water pressure, and electromagnetic stirring frequency must be reasonably matched, to obtain a high-efficiency and high-quality copper-chromium-zirconium primary billet.

Example 35

Step 3: The induction preheating temperature for continuous extrusion primary billet was 600° C.

The rest of the steps and parameters were the same as those in Example 25.

Example 36

Step 3: The interval of spray water-cooled atomizing nozzles at the outlet of continuous extrusion was 30 mm, the distance between the nozzle and the surface of the billet was 80 mm, and the water pressure was 0.2 MPa.

The rest of the steps and parameters were the same as those in Example 25.

Figure 24:
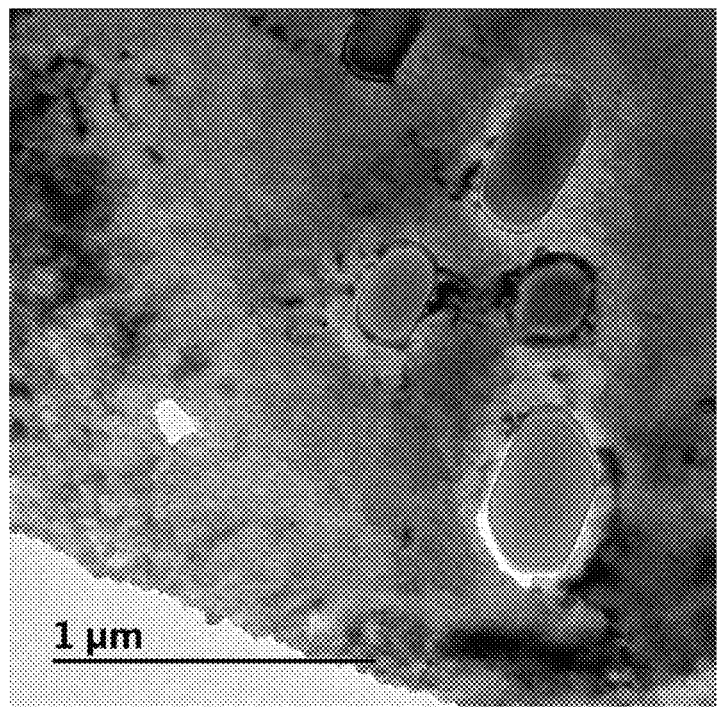
FIG. 24: A TEM structure photo of the sample after continuous extrusion of Example 36, showing the coarse chromium precipitated phase.

The comparison between Examples 25, 35 and 36 showed that, if the preheating temperature of the primary billet was low during the continuous extrusion process, or the cooling effect of the billets at the extrusion outlet was insufficient, it would decrease the comprehensive properties such as product strength and conductivity. The reason was that the early precipitation decomposition of the supersaturated solid solution generated a coarse and uneven precipitated phase (FIG. 24).

Example 37

Step 3: Preheating the continuous extrusion dies to 450° C.

The rest of the steps and parameters were the same as those in Example 25.

The comparison between Example 25 and Example 37 showed that, if the preheating temperature of the die was not enough in the continuous extrusion process, it would cause the performance of the product manufactured at the early stage of extrusion not to reach the level of 200HV&84% IACS. The reason was that the cavity temperature in the initial stage of extrusion was low, and the precipitation decomposition of the supersaturated solid solution occurred in advance; and the extrusion stress was too large, resulting in a reduction in the life of the die.

Example 38

Step 3: The extrusion ratio of continuous extrusion was 2.

The rest of the steps and parameters were the same as those in Example 25.

The comparison between Example 25 and Example 38 showed that if the extrusion ratio in the continuous extrusion process was too low, the material deformation would be insufficient and the material would not be effectively strengthened, resulting in slightly low strength of product, and slightly lower extrusion temperature. The precipitation decomposition of part of the supersaturated solid solution occurred in advance, which slightly damaged the conductivity.

Example 39

Step 3: The extrusion ratio of continuous extrusion was 10.

The rest of the steps and parameters were the same as those in Example 25.

The comparison between Example 25 and Example 39 showed that if the extrusion ratio in the continuous extrusion process was too high, although the product strength could be further increased, multiple jamming and die rupture accidents occurred, seriously damaging equipment life and productivity.

Example 40

Step 4: Cold rolling the cumulative deformation was 40%.

The rest of the steps and parameters were the same as those in Example 25.

The comparison between Example 25 and Example 40 showed that, if the cumulative deformation during cold rolling was smaller, the hardening effect on copper-chromium-zirconium sheet and strip was weak, the dislocation density was not high, and the precipitation kinetic was weak, thus, both the hardness and the conductivity were slight lower.

Example 41

Step 5: Aging treatment: The sample was annealed at 500° C., holding for 1 h.

The rest of the steps and parameters were the same as those in Example 25.

The comparison between Example 25 and Example 41 showed that, if the holding time of aging annealing was not added 0.4 h required in the invention, the alloying element could not be fully aging-precipitated, resulting in slightly low conductivity. The additional 0.4 h was a detailed consideration of the difference in the heating and uniform temperature characteristics between the large furnace and the small samples.

Example 42

Step 2: Performing high temperature solid solution after conventional horizontal continuous casting. The temperature of the holding furnace was controlled at 1250° C. The crystallizer adopted a conventional water-cooled crystallizer with a copper inner wall steel sleeve containing only one water cooling unit. The cooling water flow used selected the conventional parameters of 50 L/min, the traction speed was 10 mm/s, and the copper alloy rod was obtained by casting. The copper alloy rod produced by horizontal continuous casting was subjected to solid solution treatment, and the solid solution treatment temperature was 900° C., the heating method was on-line induction heating, the treatment time was 40 min, and the quenching adopted conventional small hole spraying, and 90 nozzles were set, with an interval of 30 mm. The distance between the nozzle and the surface of the billet was 60 mm, and the water pressure was 0.3 MPa.

The rest of the steps and parameters were the same as those in Example 25.

The comparison between Example 25 and Example 42 showed that, compared with the conventional horizontal continuous casting+high-temperature solid solution technology, the horizontal continuous casting of the present invention significantly improved the product hardness and conductivity, and did not require a high-temperature solid solution step with extremely high energy consumption.

TABLE 3

Summary of product performance and yield rate

Figure 21:
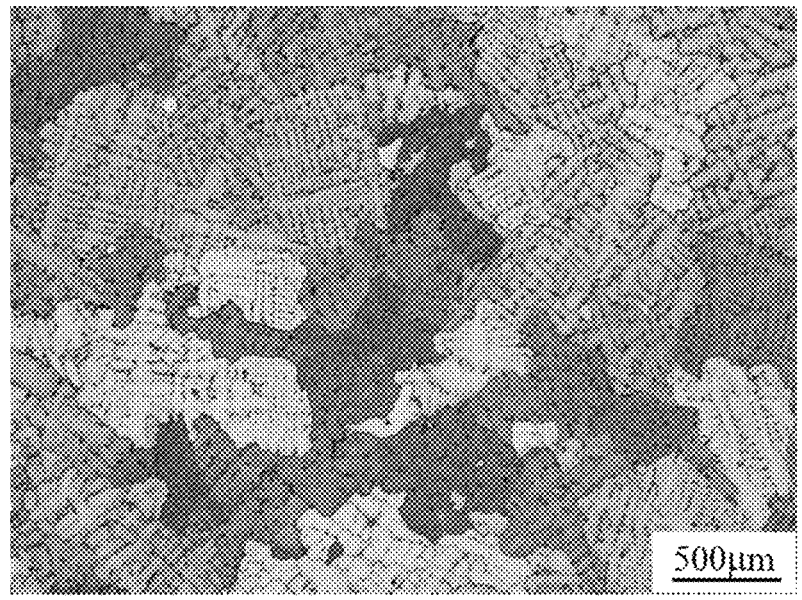
FIG. 21: A metallographic photo of the primary billet extracted from horizontal continuous casting of Example 26.
Figure 22:
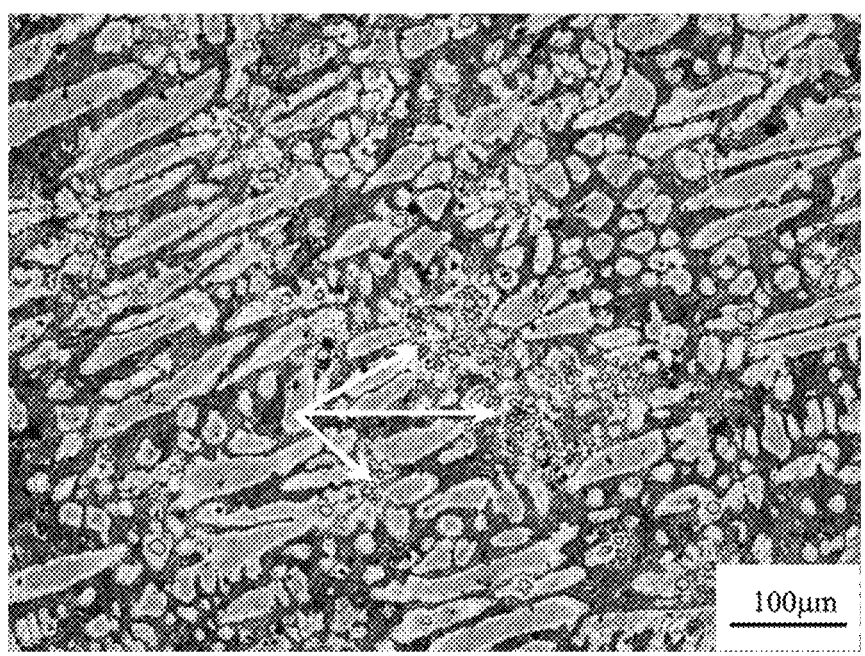
FIG. 22: A metallographic photo of the primary billet extracted from horizontal continuous casting of Example 33. The arrow points to the primary phase of chromium, indicating that primary dendrites of chromium have been formed.
Figure 23:
FIG. 23: A real object of a broken billet after horizontal continuous casting of Example 34, indicating that the extraction speed and cooling strength must be reasonably matched, otherwise the high-efficiency and high-quality casting of the copper-chromium-zirconium primary billet cannot be achieved.

| Example | Alloy | Vickers hardness (HV) | conductivity (% IACS) | Yield rate | Remarks |
|---|---|---|---|---|---|
| Example 25 | Cu-0.5 wt. % Cr-0.1 wt. % Zr | 200 | 84 | 98% | A schematic illustration of the primary billet extracted from the horizontal continuous casting was shown in FIG. 12; fine and dense grains were shown in FIG. 13; No obvious precipitated phase inside the grains were shown in FIG. 14; XRD pattern of as-cast state was shown in FIG. 15; a photo of the metallographic structure of samples after continuous extrusion was shown in FIG. 16; a TEM photo of billets after continuous extrusion and cooling was shown in FIG. 17; high-density dislocation tangle at cold rolling state was shown in FIG. 18; high-density precipitated phase at aging state was shown in FIG. 19; a high-resolution TEM structure photo of nano-precipitated phase was shown in FIG. 20. |
| Example 26 | Cu-1 wt. % Cr-0.15 wt. % Zr | 230 | 81 | 97% | A metallographic photo of the primary billet extracted from horizontal continuous casting was shown in FIG. 21. |
| Example 27 | Cu-0.5 wt. % Cr-0.1 wt. % Zr-0.05 wt. % Si | 200 | 83 | 98% | |
| Example 28 | Cu-0.5 wt. % Cr-0.1 wt. % Zr-0.03 wt. % Mg | 205 | 83 | 98% | |
| Example 29 | Cu-0.5 wt. % Cr-0.1 wt. % Zr | 190 | 84 | 97% | |
| Example 30 | Cu-0.5 wt. % Cr-0.1 wt. % Zr | 200 | 84 | 98% | |
| Example 31 | Cu-0.5 wt. % Cr-0.1 wt. % Zr | 205 | 84 | 98% | |
| Example 32 | Cu-0.5 wt. % Cr-0.1 wt. % Zr | 180 | 86 | 98% | |
| Example 33 | Cu-0.5 wt. % Cr-0.1 wt. % Zr | 145 | 81 | 98% | FIG. 22 showed too slow extraction speed, insufficient cooling strength, resulting in chromium precipitation as the primary phase. |
| Example 34 | Cu-0.5 wt. % Cr-0.1 wt. % Zr | 205 | 85 | 62% | FIG. 23 showed that the extraction speed was too fast, the cooling was too strong, the solid solution effect was better, but the breaking rate increased. |
| Example 35 | Cu-0.5 wt. % Cr-0.1 wt. % Zr | 185 | 81 | 98% | |
| Example 36 | Cu-0.5 wt. % Cr-0.1 wt. % Zr | 190 | 80 | 98% | FIG. 24 showed the supersaturated solid solution decomposed in advance, resulting in a coarse and uneven precipitated phase. |
| Example 37 | Cu-0.5 wt. % Cr-0.1 wt. % Zr | 200 | 84 | 95% | The performance of the products manufactured in the early stage of extrusion did not reach the level of 200HV&84% IACS, and the die life was relatively low. |
| Example 38 | Cu-0.5 wt. % Cr-0.1 wt. % Zr | 160 | 83 | 98% | The product strength was slightly low. |
| Example 39 | Cu-0.5 wt. % Cr-0.1 wt. % Zr | 230 | 85 | 70% | Multiple jamming, die breakage. |
| Example 40 | Cu-0.5 wt. % Cr-0.1 wt. % Zr | 120 | 81 | 98% | Low strength, weak precipitation kinetic. |
| Example 41 | Cu-0.5 wt. % Cr-0.1 wt. % Zr | 200 | 80 | 98% | Slightly low conductivity. |
| Example 42 | Cu-0.5 wt. % Cr-0.1 wt. % Zr | 175 | 78 | 98% | Weak precipitation kinetic, low strength, slightly low conductivity, high energy consumption. |

What is claimed is:

1. A method for preparing a copper alloy, comprising the following steps:
   (a) performing horizontal continuous casting to obtain an as-cast primary billet of copper alloy, wherein the alloying elements in the obtained as-cast primary billet being in a supersaturated solid solution state without precipitation strengthening;
   (b) after peeling the as-cast primary billet obtained in step (a), directly performing continuous extrusion, cold working and aging annealing treatment to obtain a copper alloy, and keeping the alloying elements of the billet in supersaturated solid solution without precipitation strengthening during the process of continuous extrusion;
   wherein the horizontal continuous casting is implemented as follows: installing at least one multi-channel water-cooled crystallizers under the side of the holding furnace, the multi-channel water-cooled crystallizers being provided with three groups of independent cooling units along the extraction direction of the primary billet to realize multi-channel water inflow and multi-channel water outflow, and adopting a reverse cooling method, to allow the first group of cooling units to be closest to the holding furnace; making the temperature of the water inlet of each group of cooling units lower than 20° C., and controlling the temperature gradient of the three groups of cooling units by the following method: the water flow V3 of the third group of cooling units and the primary billet cross-sectional area S should satisfy 0.5 L/(min·mm$^2$)<V3/S<2 L/(min·mm$^2$), and the water flow V2 of the second group of cooling units and the water flow V1 of the first group of cooling units are determined according to the principle of V1:V2:V3=1.5:1.2:1; providing electromagnetic induction coils on the outer walls of the water cooling jackets of the first and second groups of cooling units of the multi—channel water-cooled crystallizer to achieve electromagnetic stirring, the electromagnetic stirring method being rotary stirring, and the current frequency being set to 2 to 500 Hz; controlling the primary billet cross-sectional area S to be 2000 to 50 mm$^2$, and the extraction speed and the primary billet cross-sectional area satisfying 0.5 mm·min≤S/v≤20 mm·min; providing a water curtain spray cooling device within 1000 mm outside the outlet of the multi-channel water-cooled crystallizer to cool the primary billet, the spray device adopting an atomizing nozzle, and the nozzle interval being 10 to 20 mm, setting the number according to the size of the billet, such that the distance between the nozzle and the surface of the billet is 10 to 50 mm and the water pressure is 0.5 to 0.8 MPa, so as to obtain the primary billet whose alloying elements are all in a supersaturated solid solution state.

2. The method for preparing a copper alloy according to claim 1, wherein a set of horizontal continuous casting system is matched with 2 to 4 multi-channel water-cooled crystallizers to achieve continuous extraction of 2 to 4 primary billets, at this time, the crystallizers are lined up in arrangement with an interval of 200 to 400 mm, and each set of multi-channel water-cooled crystallizer is equipped with independent water cooling and electromagnetic devices.

3. The method for preparing a copper alloy according to claim 1, wherein the process conditions of continuous extrusion in step (b) are as follows:
   (1.1) adopting forged Ni-base superalloy for an extrusion die, the superalloy containing 0.05 wt. % C, 15 wt. % Cr, 6 wt. % Mo, 5 wt. % W, 2 wt. % Ti, 5.5 wt. % Al, and Ni; performing process smelting of the superalloy through vacuum melting+electroslag remelting, and forming by hot forging and heat treatment after homogenization;
   (1.2) preheating the extrusion die to 500 to 600° C. before extrusion, preheating the copper alloy as-cast primary billet to 700 to 750° C., and then entering the cavity of the extrusion die for continuous extrusion to obtain the billet, controlling the rotation speed of the extrusion wheel at 3 to 8 rpm, the extrusion ratio at 3 to 8, and the extrusion gap at 0.6 to 2 mm;
   (1.3) performing a high-intensity cooling water spray of the billet obtained in step (1.2) at the outlet of the extrusion die, the spray device adopting an atomizing nozzle, and the nozzle interval being 10 to 20 mm, setting the number according to the size of the billet, and the distance between the nozzle and the surface of the billet being 10 to 50 mm, the water pressure being 0.5 to 0.8 MPa, cooling the billet quickly from high temperature to room temperature to avoid the precipitation decomposition of the supersaturated solid solution.

4. The method for preparing a copper alloy according to claim 3, wherein the forged Ni-base superalloy is prepared according to the following steps: smelting an alloy ingot by the vacuum melting+electroslag remelting process, after homogenizing the alloy ingot at 1250° C.×1 to 4 h, forming by isothermal forging at 1000° C. to 1050° C., with a deformation of 80% to 90%; afterwards, holding at 800° C. for 8 to 16 hours, and tempering 1 to 2 hours at 300° C. to 400° C. after water quenching.

5. The method for preparing a copper alloy according to claim 1, wherein in the step (b), the pass deformation of cold working is 5% to 10%, and the cumulative deformation is 50% to 99%.

6. The method for preparing a copper alloy according to claim 1, wherein in the step (b), the annealing temperature is 300 to 600° C., and the holding time is 0.5 to 100 h.

7. The method for preparing a copper alloy according to claim 6, wherein in the step (b), the annealing temperature and holding time are selected according to the following principles: taking the billet samples after cold working, and holding at 300, 350, 400, 450, 500, 550, 600° C. for 0.1, 0.5, 1, 2, 4, 8, 16, 24, 48, 99.6 h respectively; testing the Vickers hardness and conductivity of the samples, and calculating the product of the hardness number and the conductivity value, and taking the test temperature of the sample with the largest product as the product annealing temperature, and taking the test time of the sample with the largest product plus 0.4 as the product annealing holding time.

8. The method for preparing a copper alloy according to claim 1, wherein the method is carried out according to the following steps:
   (1) batching and melting: performing batching according to the copper alloy compositions, feeding into a melting furnace to fully melt, conduct sampling detection and analysis of oxygen content and alloying element content, and after supplementing and fully deoxidization according to the analysis results, introducing the melt into the holding furnace through the melting furnace internal guide groove;
   (2) horizontal continuous casting: performing the horizontal continuous casting under the side of the holding furnace, installing at least one multi-channel water-cooled crystallizers under the side of the holding furnace, the crystallizers being provided with three groups of independent cooling units along the extraction direction of the primary billet to realize multi-channel water inflow and multi-channel water outflow, and adopting a reverse cooling method, i.e. water inflow at the cold end and water outflow at the hot end, to allow the first group of cooling units to be closest to the holding furnace; making the temperature of the water inlet of each group of cooling units lower than 20° C., and controlling the temperature gradient of the three groups of cooling units by the following method: the water flow V3 of the third group of cooling units and the primary billet cross-sectional area S are determined according to the principle of $0.5$ L/(min·mm$^2$)<V3/S<2 L/(min·mm$^2$), and the water flow V2 of the second group of cooling units and the water flow V1 of the first group of cooling units are determined according to the principle of V1:V2:V3=1.5:1.2:1, to achieve the cooling capacity of the three groups of cooling units with different strengths to form a reasonable temperature gradient; providing electromagnetic induction coils on the outer walls of the water cooling jackets of the first and second groups of cooling units of the crystallizer to achieve electromagnetic stirring, the electromagnetic stirring method being rotary stirring, and the current frequency being set to 2 to 500 Hz; the primary billet cross-sectional area S being set to 2000 to 50 mm$^2$, and the extraction speed and the primary billet cross-sectional area are determined according to the principle of $0.5$ mm·min≤S/v≤20 mm·min; providing a water curtain spray cooling device within 1000 mm outside the outlet of the crystallizer to cool the primary billet, the spray device adopting an atomizing nozzle, and the nozzle interval being 10 to 20 mm, setting the number of nozzles according to the size of the billet, the distance between the nozzle and the surface of the billet being 10 to 50 mm, and the water pressure being 0.5 to 0.8 MPa;

(3) continuous extrusion: after peeling the as-cast primary billet obtained from horizontal continuous casting, directly performing continuous extrusion, preheating the extrusion die to 500 to 600° C., preheating the copper alloy as-cast primary billet to 700 to 750° C., and then entering the cavity of the extrusion die for extrusion, controlling the rotation speed of the extrusion wheel at 3 to 8 rpm, the extrusion ratio at 3 to 8, and the extrusion gap at 0.6 to 2 mm; performing a high-intensity cooling water spray at the outlet of the extrusion die to quickly cool the billet from high temperature to room temperature, the spray device adopting an atomizing nozzle, and the nozzle interval being 10 to 20 mm, setting the number according to the size of the billet, and the distance between the nozzle and the surface of the billet being 10 to 50 mm, the water pressure being 0.5 to 0.8 MPa; the material of the extrusion die being forged Ni-base superalloy, which contains 0.05 wt. % C, 15 wt. % Cr, 6 wt. % Mo, 5 wt. % W, 2 wt. % Ti, 5.5 wt. % Al, and Ni; performing process smelting of the superalloy through vacuum melting+electroslag remelting, and forming by hot forging and heat treatment after homogenization;

(4) cold working: carry out cold working of the billet after continuous extrusion according to product requirements, the pass deformation of cold working being 5% to 10%, and the cumulative deformation being 50% to 99%;

(5) aging annealing treatment: coiling the billet after cold working and placing in a bell-type heating furnace for aging annealing treatment, first placing the billet on the lining, and then hoisting to cover the lining after the heating furnace body reaches the preset temperature, quickly heating the billet, after reaching the preset holding time, lifting the furnace body by a crane to make the billet to cool down quickly, introducing the reducing atmosphere throughout the heat treatment process to avoid oxidation; determining the product aging annealing temperature and time according to the following principles: taking billet samples after cold working in several groups, annealing at 300, 350, 400, 450, 500, 550, 600° C. for 0.1, 0.5, 1, 2, 4, 8, 16, 24, 48, 99.6 h respectively; testing the Vickers hardness and conductivity of the samples, and calculating the product of the hardness number and the conductivity value, and taking the test temperature of the sample with the largest product as the product annealing temperature, and taking the test time of the sample with the largest product plus 0.4 as the product annealing holding time;

(6) inspecting and packaging, and leaving the factory.

\* \* \* \* \*